(12) United States Patent
Kuo et al.

(10) Patent No.: US 11,418,248 B2
(45) Date of Patent: Aug. 16, 2022

(54) METHOD OF NON-ORTHOGONAL UPLINK MULTIPLEXING OF HETEROGENEOUS INFORMATION TYPES

(71) Applicant: IDAC Holdings, Inc., Wilmington, DE (US)

(72) Inventors: Ping-Heng Kuo, Bristol (GB); Alain Mourad, Staines-upon-Thames (GB); Satyanarayana Katla, London (GB); Mohammed El-Hajjar, Southampton (GB)

(73) Assignee: IDAC Holdings, Inc., Wilmington, DE (US)

( * ) Notice: Subject to any disclaimer, the term of this patent is extended or adjusted under 35 U.S.C. 154(b) by 30 days.

(21) Appl. No.: 16/982,482

(22) PCT Filed: Mar. 18, 2019

(86) PCT No.: PCT/US2019/022781
§ 371 (c)(1),
(2) Date: Sep. 18, 2020

(87) PCT Pub. No.: WO2019/182987
PCT Pub. Date: Sep. 26, 2019

(65) Prior Publication Data
US 2021/0021322 A1 Jan. 21, 2021

Related U.S. Application Data

(60) Provisional application No. 62/644,983, filed on Mar. 19, 2018.

(51) Int. Cl.
*H04B 7/06* (2006.01)
*H04W 16/28* (2009.01)
(Continued)

(52) U.S. Cl.
CPC ......... *H04B 7/0695* (2013.01); *H04L 5/0048* (2013.01); *H04L 5/0082* (2013.01);
(Continued)

(58) Field of Classification Search
CPC .......... H04B 7/0617; H04B 7/02; H04B 7/04; H04B 7/0404; H04B 7/0602;
(Continued)

(56) References Cited

U.S. PATENT DOCUMENTS 9,614,708 B1 * 4/2017 Mohamed ................ H04B 7/04
9,948,377 B1 * 4/2018 Kim ..................... H04B 7/0617
(Continued)

FOREIGN PATENT DOCUMENTS

| EP | 3422653 A1 | 1/2019 |
|---|---|---|
| WO | 2017160065 A1 | 9/2017 |
| WO | 2018009548 A1 | 1/2018 |

OTHER PUBLICATIONS

International Search Report and Written Opinion of the International Searching Authority for PCT/US2019/022781 dated May 23, 2019, 27 pages.
(Continued)

*Primary Examiner* — David S Huang
(74) *Attorney, Agent, or Firm* — invention Mine LLC

(57) ABSTRACT

An example disclosed method includes (i) modulating a first type of uplink information using beam direction modulation with an uplink beam direction pattern applied over a set of allocated uplink radio resource, (ii) modulating a second type of uplink information using an in-phase quadrature
(Continued)

(IQ)-based modulation scheme, wherein modulation symbols of the IQ-based modulation scheme are transmitted on a plurality of uplink beams used to modulate the first type of uplink information across same set of allocated uplink radio resources as the set of allocated uplink radio resources used for the beam direction modulation, (iii) and transmitting the modulated first type of uplink information and the modulated second type of uplink information over an air interface.

19 Claims, 16 Drawing Sheets

(51) Int. Cl.
*H04L 27/36* (2006.01)
*H04L 5/00* (2006.01)
*H04L 25/02* (2006.01)

(52) U.S. Cl.
CPC ........ *H04L 25/0226* (2013.01); *H04L 27/362* (2013.01); *H04W 16/28* (2013.01)

(58) Field of Classification Search
CPC .. H04B 7/0604; H04B 7/0626; H04B 7/0628; H04B 7/0695; H04L 5/0048; H04L 5/0082; H04L 25/0226; H04L 27/362; H04W 16/28
See application file for complete search history.

(56) References Cited

U.S. PATENT DOCUMENTS

| | | |
|---|---|---|
| 2010/0239040 A1 | 9/2010 | Beluri |
| 2015/0009951 A1 | 1/2015 | Josiam |
| 2015/0326360 A1 | 11/2015 | Malladi |
| 2016/0164581 A1* | 6/2016 | Kim ................... H04W 72/046 370/329 |
| 2017/0155484 A1 | 6/2017 | Kang |
| 2017/0366311 A1 | 12/2017 | Iyer et al. |
| 2017/0366331 A1 | 12/2017 | Vermeulen |
| 2018/0091210 A1 | 3/2018 | Hessler |
| 2019/0081751 A1* | 3/2019 | Miao ................... H04L 25/0224 |

OTHER PUBLICATIONS

Third Generation Partnership Project, "Discussion on UL Beam Management". LG Electronics, 3GPP Draft, R1-1710282, vol. RAN WG1, Jun. 26, 2017.
International Preliminary Report on Patentability PCT/US2019/022781 dated Sep. 22, 2020, 23 pages.
Third Generation Partnership Project, "3rd Generation Partnership Project; Technical Specification Group Radio Access Network; Study on New Radio Access Technology Physical Layer Aspects". 3GPP TR 38.802 V14.1.0, (Release 14), Jun. 2017, 144 pages.
Wu, Zhanji, et. al., "Signal Space Diversity Aided Dynamic Multiplexing for eMBB and URLLC Traffics". 3rd IEEE International Conference on Computer and Communications (ICCC), (2017), pp. 1396-1400.

* cited by examiner

METHOD OF NON-ORTHOGONAL UPLINK MULTIPLEXING OF HETEROGENEOUS INFORMATION TYPES

CROSS-REFERENCE SECTION

The present application is a national stage application under 35 U.S.C. § 371 of International Application No. PCT/US2019/022781, entitled "METHOD OF NON-ORTHOGONAL UPLINK MULTIPLEXING OF HETEROGENEOUS INFORMATION TYPE," filed on Mar. 18, 2019, which claims benefit under 35 U.S.C. § 119(e) from U.S. Provisional Patent Application Ser. No. 62/644,983 filed Mar. 19, 2018, entitled "Method of Non-Orthogonal Uplink Multiplexing of Heterogeneous Information Types," each of which is incorporated herein by reference in its entirety.

BACKGROUND

Radio access networks in 5G and beyond may comprise densely deployed small cells and/or transmit/receive points (TRPs), which may lead to ultra-dense network (UDN) scenarios. Within an ultra-dense network (UDN) scenario for 5G and beyond, a user equipment (UE) may be exposed simultaneously to multiple TRPs with relatively high signal quality.

SUMMARY

Example techniques for utilization of multiple TRPs are provided herein. More specifically, example methods and systems disclosed herein in accordance with some embodiments may provide schemes utilizing multiple TRPs (or other forms of transmit/receive elements (e.g., multiple antenna panels)) to provide enhanced data transmission of heterogenous types of information.

According to some embodiments, a method, performed by a wireless transmit/receive unit (WTRU), includes: transmitting a plurality of uplink reference signals, wherein each uplink reference signal is transmitted in a respective different beam direction; in response to the transmitted plurality of uplink reference signals, receiving at least one control signal, wherein the at least one control signal identifies a plurality of uplink beam directions to be used for uplink transmission; modulating a first type of uplink information using beam direction modulation, wherein the first type of uplink information is mapped to an uplink beam direction pattern among multiple allocated uplink radio resources; and modulating a second type of uplink information using an in-phase quadrature (IQ)-based modulation scheme, wherein modulation symbols of the IQ-based modulation scheme are transmitted on a plurality of uplink beams used to modulate the first type of uplink information across the multiple allocated uplink radio resources.

In some embodiments, the method further includes receiving an indication of allocation of the multiple uplink radio resources. In some embodiments, each of the plurality of uplink reference signals is a Sounding Reference Signal (SRS). In some embodiments, the at least one control signal indicates a plurality of Sounding Reference Signal Indicators (SRIs) that identify the plurality of uplink beam directions to be used for the uplink transmission. Further, in some embodiments, each of the plurality of uplink beam directions identified by the at least one control signal provides a signal quality that exceeds a threshold.

In some embodiments, the method further includes applying precoding to each of the plurality of uplink reference signals to transmit each uplink reference signal in the respective different beam direction. In some embodiments, modulating the first type of uplink information and the second type of uplink information includes modulating the first and second types of uplink information only in a time domain. In some embodiments, modulating the first type of uplink information and the second type of uplink information includes modulating the first and second types of uplink information only in a frequency domain. In some embodiments, modulating the first type of uplink information and the second type of uplink information includes modulating the first and second types of uplink information across a time-frequency frequency domain. Further, in some embodiments, modulating the first type of uplink information is performed synchronously with modulating the second type of uplink information.

In some embodiments, modulating the first type of uplink information using the beam direction modulation comprises determining a given number of bits to be transmitted over the multiple allocated uplink radio resources per each beam direction modulation instance. Determining the given number of bits to be transmitted includes, in some embodiments, using a number of the uplink beam directions, a number of beams that can be transmitted by the WTRU in different beam directions in a same radio resource, and a number of the multiple allocated uplink radio resources. In some embodiments, the method further includes receiving an indication of a number of the multiple allocated uplink radio resources.

In some embodiments, the method further includes transmitting a request to a network for multiplexing the first type of uplink information and the second type of uplink information using the beam direction modulation and the IQ-based modulation scheme, respectively, across the multiple allocated uplink radio resources; and carrying out the method if a permission is granted by the network. Further, in some embodiments, the first type of uplink information includes delay-tolerable traffic, and the second type of uplink information comprises delay-sensitive traffic. In some embodiments, the first type of uplink information includes redundancy information, and the second type of uplink information includes data payload information. Yet further, in some embodiments, the first type of uplink information includes control information, and the second type of uplink information includes uplink data information.

Further, in some embodiments, the method further includes transmitting the modulated first type of uplink information and the modulated second type of uplink information over an air interface as multiplexed signals. The modulated first type of uplink information is, in some embodiments, transmitted towards two or more transmit/receive elements in accordance with the uplink beam direction pattern. In some embodiments, the two or more transmit/receive elements comprise two or more transmit/receive points (TRPs). In some embodiments, the two or more transmit/receive elements comprise two or more antenna panels of a multi-panel antenna unit. Additionally, in some embodiments, a first transmit time interval (TTI) corresponding to the first type of uplink information is different from a second TTI corresponding to the second type of uplink information.

According to some embodiments, a method, performed by a wireless transmit/receive unit (WTRU), includes: modulating a first type of uplink information using beam direction modulation with an uplink beam direction pattern applied over a set of allocated uplink radio resources; modulating a second type of uplink information using an in-phase quadrature (IQ)-based modulation scheme, wherein modulation symbols of the IQ-based modulation scheme are transmitted on a plurality of uplink beams used to modulate the first type of uplink information across same set of allocated uplink radio resources as the set of allocated uplink radio resources used for the beam direction modulation; and transmitting the modulated first type of uplink information and the modulated second type of uplink information over an air interface.

In some embodiments, modulating the first type of uplink information is performed synchronously with modulating the second type of uplink information. In some embodiments, transmitting the modulated first type of uplink information and the modulated second type of uplink information includes transmitting the modulated first type of uplink information and the second type of uplink information as multiplexed signals. In some embodiments, the modulated first type of uplink information is transmitted towards two or more transmit/receive elements in accordance with the uplink beam direction pattern. The two or more transmit/receive elements, in some embodiments, include two or more transmit/receive points (TRPs). The two or more transmit/receive elements, in some embodiments, include two or more antenna panels of a multi-panel antenna unit.

In some embodiments, the method further includes receiving from a network an indication of the plurality of uplink beams. In some embodiments, modulating the first type of uplink information and the second type of uplink information includes modulating the first and second types of uplink information only in a time domain. In some embodiments, modulating the first type of uplink information and the second type of uplink information includes modulating the first and second types of uplink information only in a frequency domain. In some embodiments, modulating the first type of uplink information and the second type of uplink information includes modulating the first and second types of uplink information across a time-frequency frequency domain.

Further, in some embodiments, the set of set of allocated uplink radio resources includes a single radio resource unit. The single radio resource unit, in some embodiments, is a single Orthogonal Frequency Division Multiplexing (OFDM) time-frequency element. In some embodiments, the set of set of allocated uplink radio resources includes multiple radio resource units. Additionally, in some embodiments, a first transmit time interval (TTI) corresponding to the first type of uplink information is different from a second TTI corresponding to the second type of uplink information.

Other embodiments include a system and a WTRU configured (e.g., having a processor and a non-transitory computer-readable medium storing instructions for execution by the processor) to perform the methods described herein.

BRIEF DESCRIPTION OF THE DRAWINGS

A more detailed understanding may be had from the following description, presented by way of example in conjunction with the accompanying drawings. Furthermore, like reference numerals in the figures indicate like elements.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

Example networks for implementation of systems and methods described herein, in accordance with some embodiments, will now be described.

Note that, in embodiments described herein, a wireless transmit/receive unit (WTRU) may be used as a user terminal, user equipment (UE), user device, mobile device, and/or the like.

Figure 1A:
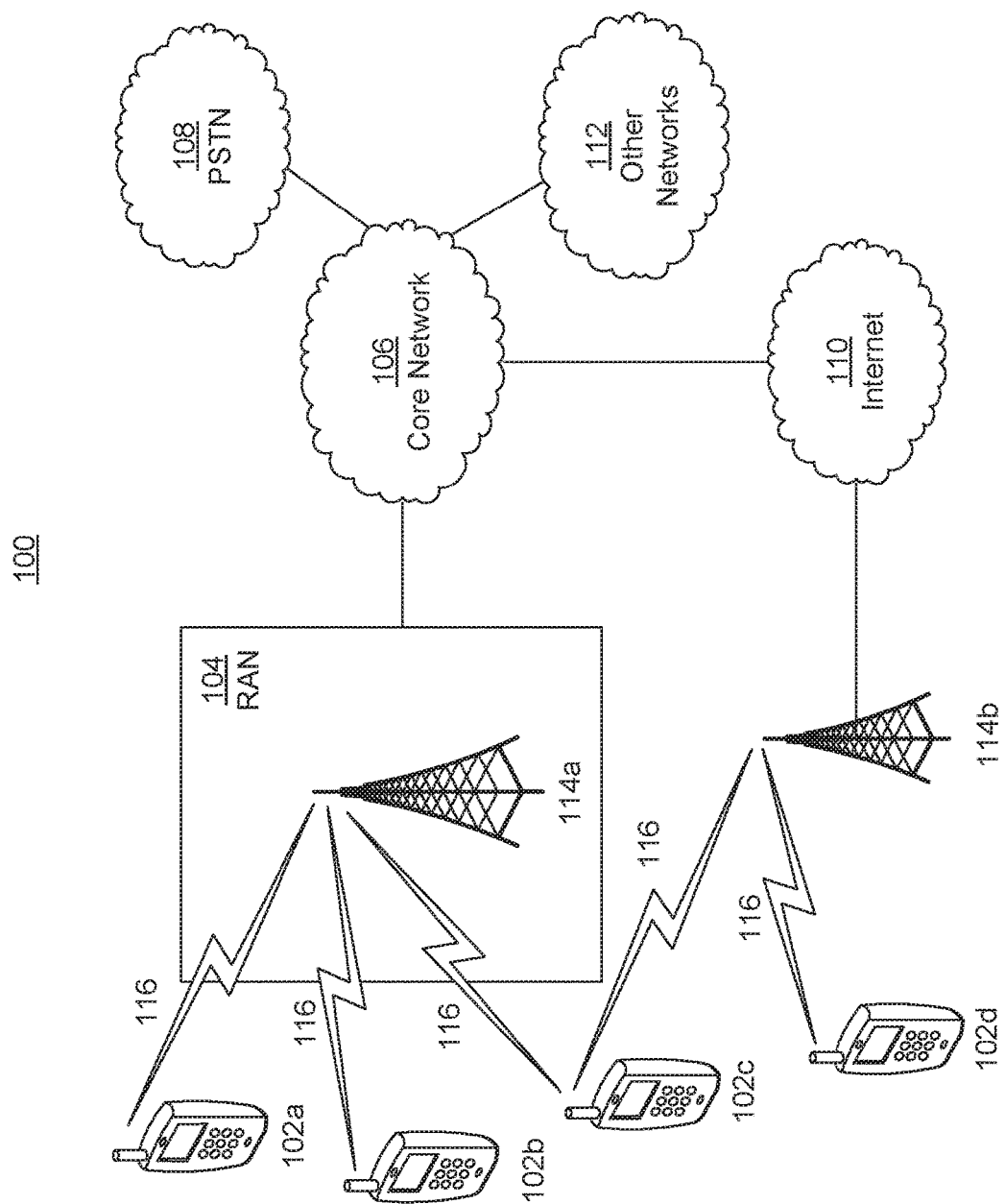
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, and broadcast, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, and filter bank multicarrier (FBMC).

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode-B, a Home Node B, a Home eNode-B, a gNB, a NR NodeB, a site controller, an access point (AP), a wireless router, and the like. While the base stations 114a, 114b are each depicted as a single element, the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), and relay nodes. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), and visible light). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, and NR) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, and/or perform high-level security functions, such as user authentication. Although not shown in FIG. 1A, the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
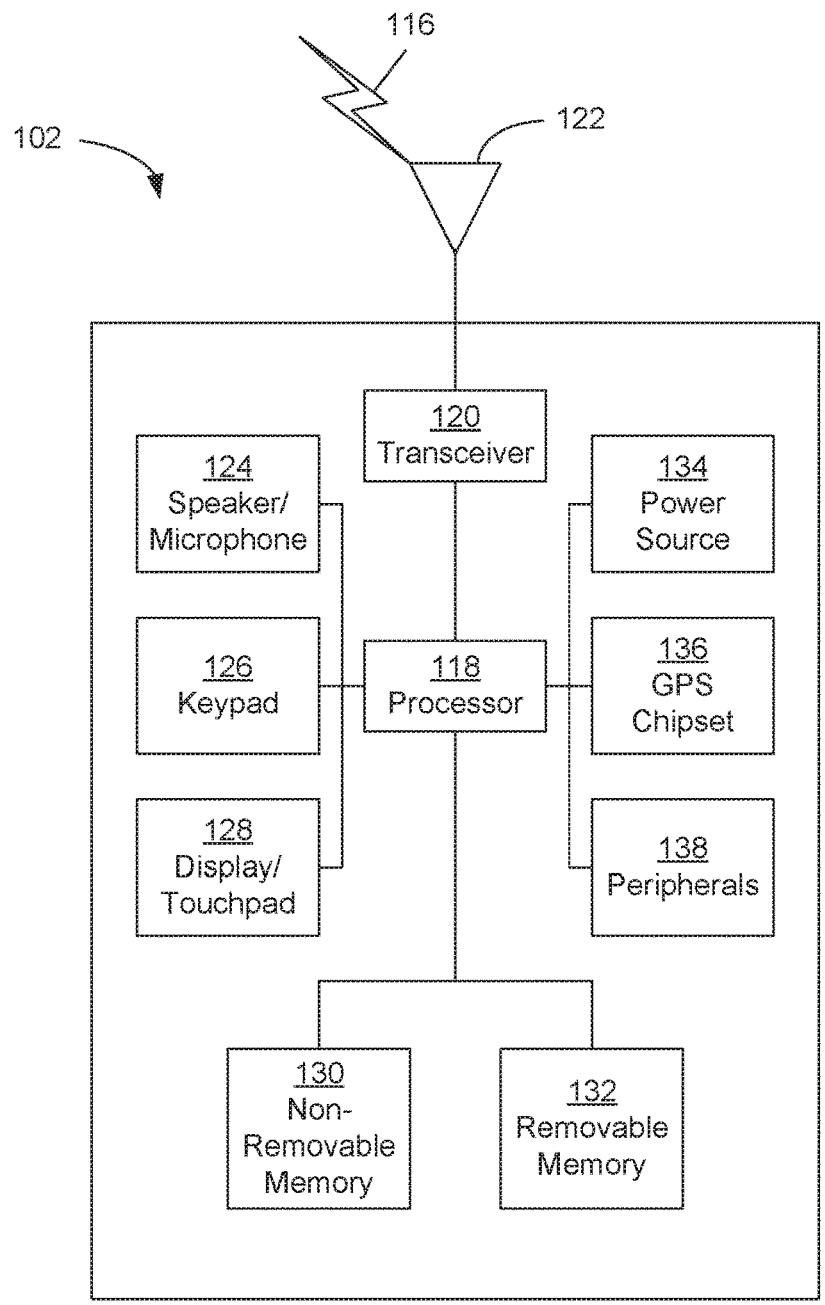
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. The WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. The transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), and lithium-ion (Li-ion)), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
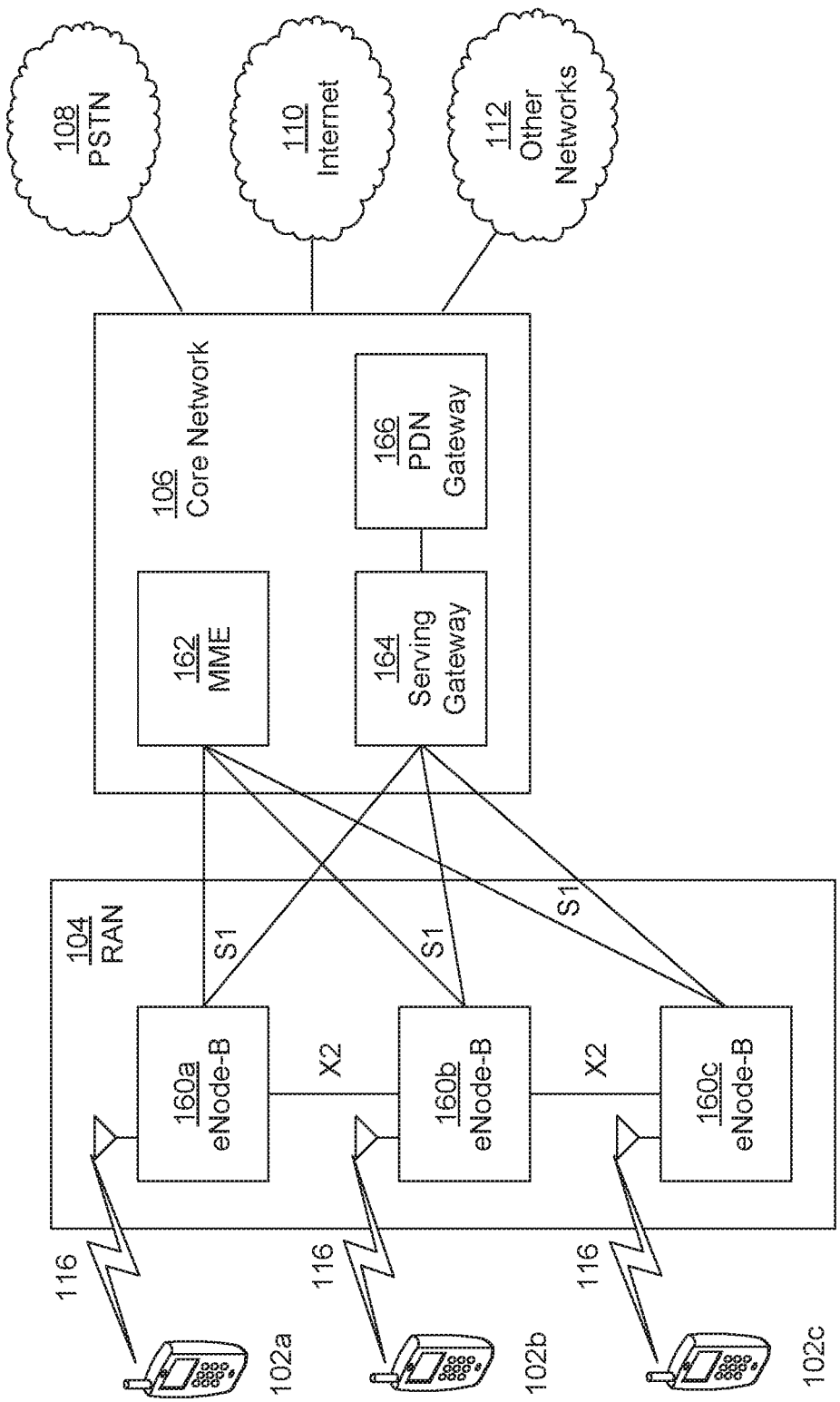
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 1 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
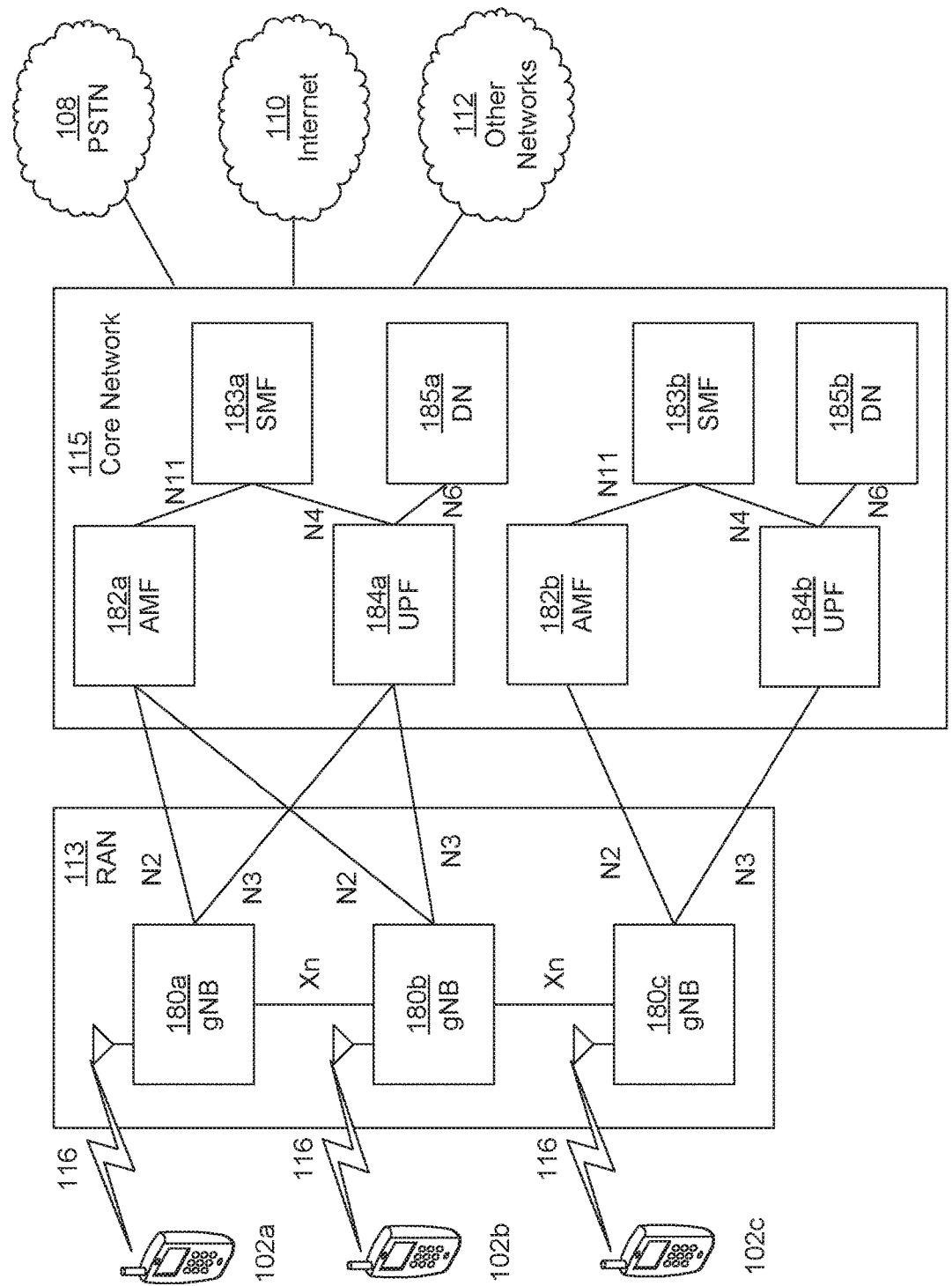
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi- Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and alternatively a Data Network (DN) 185a, 185b. While each of the foregoing elements are depicted as part of the CN 115, any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Note that various hardware elements of one or more of the described embodiments are referred to as "modules" that carry out (perform or execute) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (hardwired) instructions, firmware instructions, software instructions, and/or the like, and may be stored in any suitable non-transitory computer-readable medium or media, such as commonly referred to as RAM or ROM.

As noted above, within an ultra-dense network (UDN) scenario for 5G and beyond, a user equipment (UE) device may be exposed simultaneously to multiple transmit/receive points (TRPs) with a relatively high signal quality. Radio access networks in 5G and beyond may comprise densely deployed small cells and/or transmit/receive points (TRPs), which may lead to ultra-dense network (UDN) scenarios. In such cases, a user terminal may have access simultaneously to multiple access nodes with good signal quality, and such characteristics may allow performance enhancement via multi-node diversity or multi-connectivity.

Figure 2:
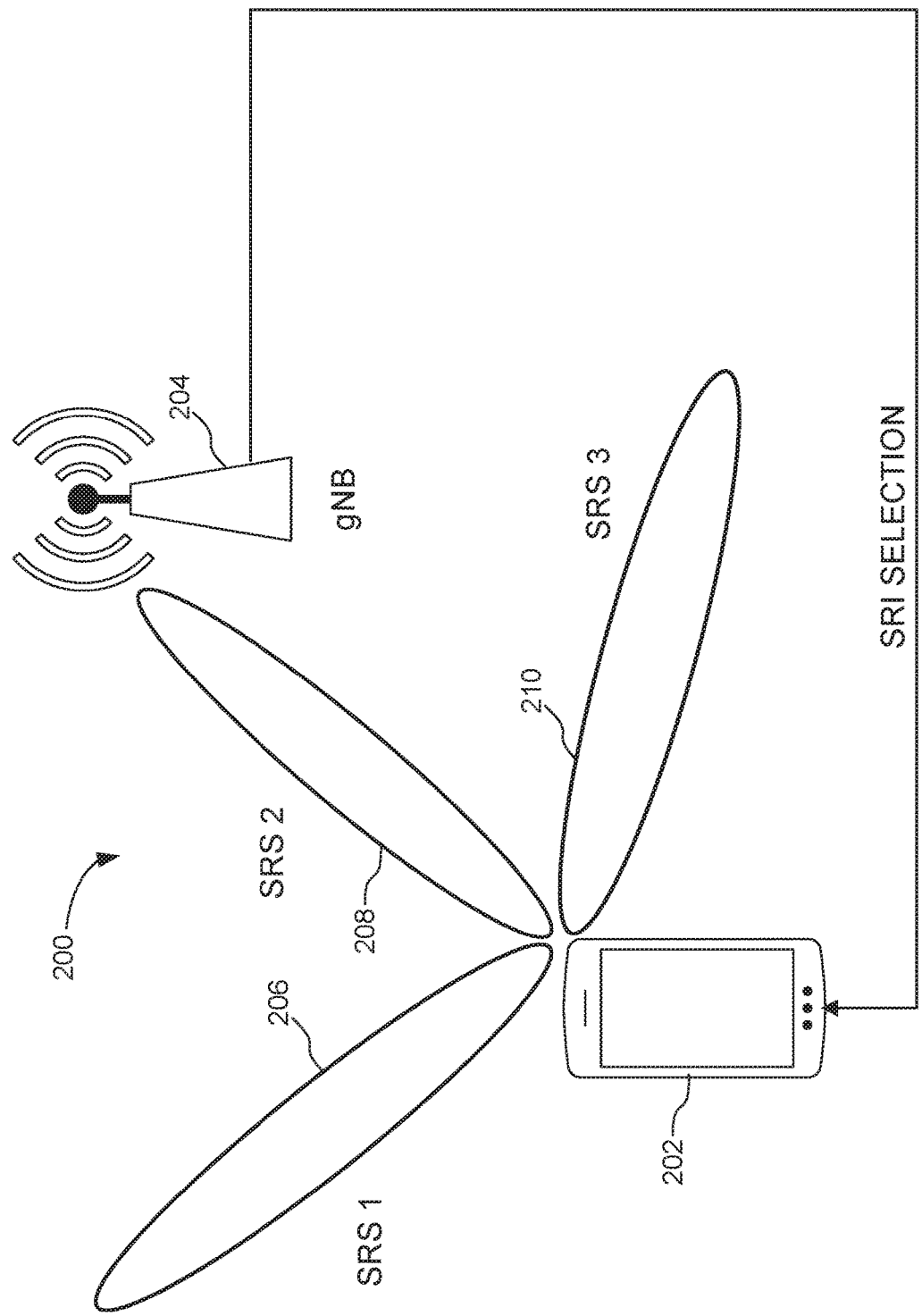
FIG. 2 illustrates an example system arrangement illustrating a user equipment (UE) transmitting Sounding Reference Signals (SRSs) in multiple directions, in accordance with some embodiments.
Figure 3:
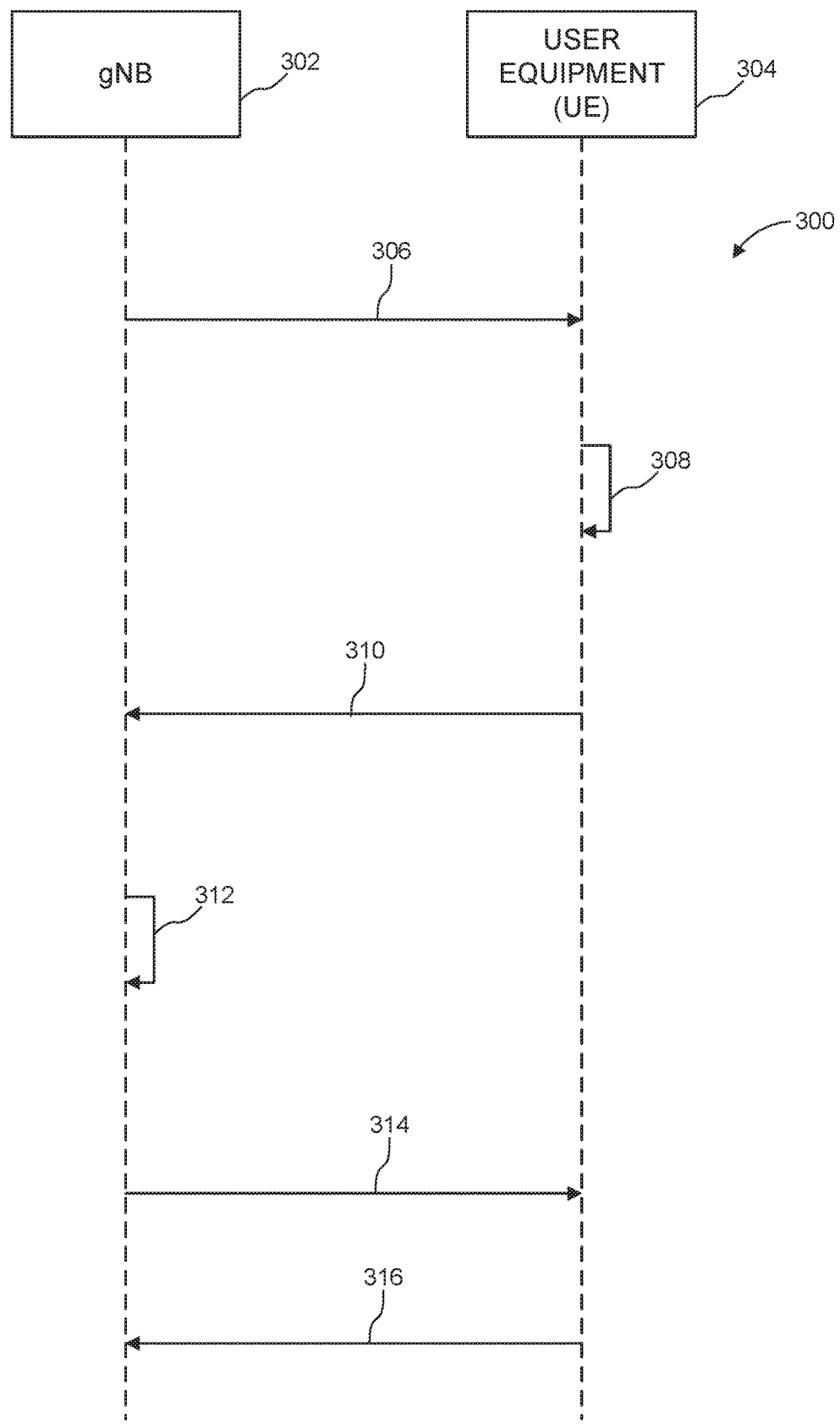
FIG. 3 is an example message sequencing diagram for transmitting a Sounding Reference Signal (SRS) between a user equipment (UE) and a gNB (next Generation NodeB), in accordance with some embodiments.

For a 3GPP New Radio (NR) framework, for example, a network may configure multiple precoded Sounding Reference Signal (SRS) resources that enable a user terminal to transmit in different directions via uplink beamforming (e.g., toward different TRPs). Based on channel estimation at a gNB, a network may determine and instruct a user terminal (or user equipment) via a downlink control signal (e.g., a signal sent via a Physical Downlink Control Channel (PDCCH)) which beam may be applied for subsequent uplink data transmission (e.g., via a Physical Uplink Shared Channel (PUSCH)), as illustrated in FIGS. 2 and 3. Because such a beam selection mechanism may be based on instantaneous channel status among multiple nodes, performance may be improved for some embodiments by steering uplink beams to an access node. Such steering may select a most appropriate access node with the strongest link gain (or for example, a Reference Signal Received Quality (RSRQ) higher than a predefined threshold, such as, e.g., −15 dB) with respect to the user terminal.

FIG. 2 illustrates an example system arrangement 200 illustrating a UE 202 transmitting multiple SRSs in multiple directions, in accordance with some embodiments. FIG. 2 illustrates 5G NR uplink signals with a precoded SRS. See, e.g., 3GPP TR 38.802 V14.1.0, "Study on New Radio Access Technology Physical Layer Aspects (Release 14)", June 2017 (describing sending uplink precoded SRS). As shown in FIG. 2, multiple SRSs 206, 208, and 210 are transmitted with beam patterns that steer the signals 206, 208, and 210 in multiple directions for reception at a gNB 204. A selection of an SRS resource indicator (SRI) (e.g., also referred to in 3GPP standards as "an indication of a SRS resource") may correspond, e.g., to a beam direction with, e.g., the highest link quality from among link qualities associated with other beam directions for uplink data transmission. The SRI selection may be then sent by the gNB 204 to the UE 202.

FIG. 3 is an example message sequencing diagram 300 for transmitting an SRS between a user equipment (UE) and a gNB (next Generation NodeB), in accordance with some embodiments. FIG. 3 shows an example message flow in accordance with some embodiments for sending messages between a gNB 302 and a UE 304 to configure transmission of SRS uplink data. At 306, the gNB 302 configures multiple SRS resources via communication with the UE 304. Such configurations may be handled, for example, via a Radio Resource Control (RRC) message. At 308, the UE 304 may determine beams (e.g., precoders) for multiple SRS resources. At 310, the UE may transmit an SRS using each configured resource, or multiple SRSs. At 312, the gNB 304 may determine (e.g., select) an SRI. At 314, the SRI selection may be sent to the UE 302 via a Downlink Control Information (DCI) to indicate a selection of an SRS resource, or an uplink beam for uplink transmission. Subsequently, at 316, the UE 302 may transmit uplink data according to the received SRI. In various embodiments described herein, uplink reference signals may be SRSs.

In some embodiments, apart from scenarios with multiple transmit/receive points (TRPs), example techniques described, e.g., above also may be used with a gNB equipped with multi-panel antenna arrays, where, e.g., an SRI indicates the best panel (among multiple panels at the same gNB) for uplink reception. These panels may be separated by a distance (e.g., five (5) times a wavelength) such that channel responses between panels may be uncorrelated.

In some embodiments of systems and methods disclosed herein, a UE transmits multiple (e.g., two or more) different types of traffic to an access network. Uplink transmissions may occur in an ultra-dense network (UDN) scenario. In some embodiments, for example, with the systems and methods described herein, a UE may substantially simultaneously (e.g., synchronously) transmit (e.g.) two bitstreams representing (e.g.) two different types of traffic to a gNB: (i) one bitstream may be modulated via I/Q (also referred to herein as "IQ") modulation, and (ii) the second bitstream may be modulated via beam direction modulation by modulating uplink beam direction.

In some embodiments, disclosed herein is an uplink transmission method capable of multiplexing (e.g.) two different types of traffic using non-orthogonal radio resources, which conveys a first type of traffic information based on uplink beam directions among multiple radio resource units, and conveys a second type of traffic information using conventional IQ modulation symbols to be carried by the uplink beams.

In some embodiments, a processing chain at a transmitter (and receiver) capable of realizing uplink multiplexing (and demultiplexing) method disclosed herein, may map a first type of traffic information to a spatial processing pattern and may map a second type of traffic information to IQ modulation symbols.

In some embodiments, a message exchange procedure may be used to initialize configuration of an uplink multiplexing method, such as based on a joint use of beam direction modulation and IQ-based modulation.

In some embodiments, a UE is able to multiplex different types of uplink information using the same radio resource(s). Such multiplexing may be performed to improve efficiency and/or latency.

In some embodiments, a UE may multiplex traffic originated by enhanced mobile broadband (eMBB) services and ultra-reliable low-latency communications (URLLC). For instance, a connected vehicle may have to report sensor readings with very low latency (such as for the sake of safety) while at the same time, for example, uploading a video call in which passenger(s) in the vehicle participate or a video game played by the vehicle passenger(s).

In some embodiments, a UE may multiplex uplink data payload and its associated redundant coded bits to reduce latency caused by a Hybrid Automatic Repeat Request (HARQ) re-transmission. If there is an error detected in an uplink transport block, a gNB may use multiplexed additional redundancy to decode the uplink transport block without sending a request for re-transmission.

In some embodiments, a UE may multiplex uplink data and control signaling in the same radio resource to increase spectral efficiency. For example, a gNB may decode uplink data while receiving uplink control information (UCI).

In some embodiments of systems and methods disclosed herein, the term "multiplexing" refers to a joint non-orthogonal transmission using identical time, frequency, or time-frequency resource elements.

In contrast, in other techniques, for example, multiplexing may be performed with uplink multiple-input and multiple-output (MIMO) techniques, such as spatial multiplexing, where different information symbols are allocated to different spatial layers. Spatial multiplexing uses transmission power splitting among multiple information layers and may result in performance degradation due to power losses. Uplink channels supporting spatial multiplexing may be unavailable due to a potential rank-deficiency caused by small antenna spacing at the UE or a strong line-of-sight (LoS) propagation path.

For example, a UE may multiplex URLLC and eMBB traffic. In some embodiments, a 3GPP NR may allow URLLC traffic to "cut through" an on-going eMBB transmission that already has been scheduled so that the URLLC traffic is able to fulfill a delay requirement. As a result, eMBB communications may have a performance degradation because coded bits are pre-empted and punctured by URLLC data (which may occur spontaneously) due to a radio resource collision.

Further, in some embodiments, various scenarios addressed herein are different from scenarios addressed, e.g., by uplink non-orthogonal multiple access (NOMA) messages. Uplink NOMA may be used by two UEs (which may have different channel conditions) to share the same resource. In contrast, according to some embodiments disclosed herein, multiple types of traffic data originate from the same single UE.

Currently, it is understood that there is no known scheme specifically designed to multiplex different types of uplink information originating from the same UE using non-orthogonal resources. For 5G and beyond, a UE may be exposed simultaneously to more than one access node due to ultra-dense deployment of TRPs in a radio access network. Furthermore, some access nodes may be equipped with multiple antenna panels separated by a (sufficient) distance such that channel responses between panels may be uncorrelated and receive arrays may be processed from a UE perspective as multiple independent connectable receive arrays. Methods and systems disclosed herein in accordance with some embodiments may enable a UE to multiplex two or more different uplink traffic types using non-orthogonal resources.

Various example embodiments are described below in more detail.

In some embodiments, a UE multiplexes two or more different uplink traffic types using non-orthogonal resources. Such embodiments may include or involve an uplink traffic multiplexing scheme based on beam modulation, potential example design implications for transceiver processing chains as a result of using an uplink traffic multiplexing scheme, and system procedures for authorizing and configuring an uplink traffic multiplexing scheme.

Example uplink traffic multiplexing scheme based on beam modulation, in accordance with some embodiments, will now be described.

Systems and methods disclosed herein in accordance with some embodiments multiplex different types of uplink traffic from the same UE using non-orthogonal radio resources. In some embodiments, if a UE is located in a UDN area and is exposed to multiple TRPs with a sufficiently good link quality (as a non-limiting example, with a RSRQ higher than −15 dB), a first type of traffic is transmitted using uplink beam direction patterns across multiple radio resource units, and a second type of traffic is transmitted using in-phase-quadrature (IQ) modulation of symbols on an uplink beam.

In some embodiments, an example conveyance of first type of traffic may be carried out, e.g., as follows.

In some embodiments, more than one TRP (or, e.g., an antenna panel) may detect an appropriately-configured uplink beam from a UE with sufficiently high signal strength (such as, for one non-limiting example, an RSRQ higher than −15 dB). Accordingly, an access node (such as a gNB) may retrieve uplink information by detecting how uplink beams are steered (or, e.g., directed) across multiple radio resources.

For example, if a UE is allocated with two time-domain mini-slots (e.g., one OFDM symbol per mini-slot) for uplink transmission and configured with two uplink beams (denoted as $B_1$ and $B_2$) directed toward two different TRPs ($B_1$ for a beam directed toward TRP 1, and $B_2$ for a beam directed toward TRP 2), the UE may modulate uplink information bits based on Table 1, which illustrates an example of time domain mini-slot allocation.

TABLE 1

| | Corresponding Beam Directions Over Two Mini-Slots | |
| --- | --- | --- |
| Uplink Information Bits | Uplink Beam for First Mini-Slot | Uplink Beam for Second Mini-Slot |
| 00 | $B_1$ | $B_1$ |
| 01 | $B_1$ | $B_2$ |
| 10 | $B_2$ | $B_1$ |
| 11 | $B_2$ | $B_2$ |

In some embodiments, an example relationship such as Equation 1 may be used in determining a total of number of bits to be transmitted (e.g., per uplink beam modulation).

Equation 1 provides that a total number of bits, b, transmitted per uplink beam modulation (UBM) (e.g., also referred to herein in places as "beam direction modulation") session (e.g., instance), may be calculated as follows:

$$b = \lfloor \log_2[(C_L^N)^R] \rfloor \quad \text{Eqn. 1}$$

where N is a total number of beam directions that may be perceived by a gNB (the number of TRPs that are exposed to the UE with a sufficiently high signal quality (for example, an RSRQ higher than −15 dB)); L is a number of beams that a UE may transmit within the same radio resource unit; and R is a number of allocated radio resource units. The function $\lfloor x \rfloor$ is the largest integer smaller than x, and $$C_y^x = \frac{x!}{y!(x-y)!}.$$

As another example in accordance with some embodiments, if a UE is configured with four beams (denoted as $B_1$, $B_2$, $B_3$, and $B_4$) and a UE is exposed to four access nodes/antenna panels, and if the UE transmits two beams simultaneously, a total number of combinations of beam patterns over two resources will be 36 based on Equation 1. For this example, 5 information bits may be transmitted over two timeslots:

$$b_{example\_1} = \lfloor \log_2[(C_2^4)^2] \rfloor = \left\lfloor \log_2\left[\left(\frac{4!}{2!(4-2)!}\right)^2\right] \right\rfloor = \left\lfloor \log_2\left[\left(\frac{(4)(3)(2)}{(2)(2)}\right)^2\right] \right\rfloor$$

$$b_{example\_1} = \lfloor \log_2[(6)^2] \rfloor = \lfloor \log_2[36] \rfloor = \lfloor 5.16 \rfloor = 5$$

The above example focuses on radio resources in the time domain, but the example may be extended to radio resources in the frequency domain as well. For a two-dimensional time-frequency resource grid for LTE and 5G NR, a UE may transmit different beams among resource elements (REs) within a physical resource block (PRB) to modulate uplink information. For LTE, there are 7 OFDM symbols and 12 subcarriers within each PRB, which means a PRB has 84 allocated radio resource units (R=84) if reference signals are omitted.

To illustrate, if N=4 and L=2, a UE may transmit 217 bits of a first type of traffic for every PRB:

$$b_{example\_2} = \lfloor \log_2[(C_2^4)^{84}] \rfloor =$$
$$\left\lfloor \log_2\left[\left(\frac{4!}{2!(4-2)!}\right)^{84}\right] \right\rfloor = \left\lfloor \log_2\left[\left(\frac{(4)(3)(2)}{(2)(2)}\right)^{84}\right] \right\rfloor = \lfloor \log_2[(6)^{84}] \rfloor$$

$$b_{example\_2} = \lfloor \log_2[2.315e65] \rfloor = \lfloor 217.13 \rfloor = 217$$

Hence, in some embodiments, a first type of uplink information may be modulated using uplink beam directions across one or more resources units.

According to some embodiments, the first type of uplink information may be mapped to an uplink beam direction pattern among multiple allocated uplink radio resources, as illustrated above. In some embodiments, the uplink beam direction pattern may refer to a pattern according to which the uplink beam directions are varied, such as switched or selected, to modulate the information. For instance, as shown in the example in Table 1, to modulate two uplink "00" information bits, a UE may select beam $B_1$ in the first mini-slot and also select $B_1$ in the second mini-slot. On the other hand, to modulate, e.g., two uplink "01" information bits, a UE may select the beam $B_1$ in the first mini-slot and then switch to the beam $B_2$ in the second mini-slot. Modulating information bits "10" and "11," may proceed in a corresponding manner, as shown in Table 1. Further, as described above, a total number of bits that may be transmitted per uplink beam modulation (UBM) session (e.g., instance) may be, e.g., increased if a UE has a capability to simultaneously transmit (e.g., launch) multiple beams directed in different directions, respectively. This example technique can increase a combination of beam directions that may be selected or switched to vary uplink beam direction in accordance with bits to be transmitted.

Note that, in some embodiments, uplink information may be modulated using a single radio resource ((radio) resource unit). In the case of a single resource unit (e.g., a single OFDM time-frequency element (e.g., resource element (RE) (e.g., subcarrier))), an uplink beam modulation may include a selection of a particular uplink beam direction out of multiple uplink beam directions for data modulation.

In some embodiments, referring to Equation 1 above, if R is equal to one (1), then it is possible to carry out UBM given that L (representing the number of beams that a UE may transmit within the same radio resource unit) is less than N (representing the total number of beam directions that may be perceived by a gNB).

By way of example, if R=1, L=1, and N=4 (e.g. if a UE is communicating with four TRPs), then the UE may transmit using one beam direction out of 4 possible beam directions. Assuming that $B_1$, $B_2$, $B_3$, $B_4$ denote beams directed, e.g., toward four different TRPs, then the UE may transmit two bits depending on which beam the UE selects. An example mapping of bits to different beam directions is shown in Table 2. By way of example in Table 2, if the UE wishes to transmit the bits "00," then it may choose to use $B_1$. If the UE wishes to transmit the bits "00", then it may select $B_2$ as a beam direction to which the "01" bits are mapped to.

TABLE 2

| Uplink Information Bits | Corresponding Beam Directions Used In One Radio Resource (Unit) |
|---|---|
| 00 | B1 |
| 01 | B2 |
| 10 | B3 |
| 11 | B4 |

Hence, according to some embodiments, if R=1, then the uplink beam modulation may essentially comprise beam direction selection for that one single radio resource unit. Otherwise if R>1, then, in some embodiments, uplink information may be modulated using a sequence of beam directions across the R>1 radio resource units.

In some embodiments, an example conveyance of a second type of traffic different from the first type of traffic may be carried out as described, e.g., below.

In some embodiments, the second type of traffic may be transmitted by in-phase-quadrature (IQ) modulation with symbols carried on uplink beams over multiple radio resources. As noted above, the first type of uplink information bits may be modulated using uplink beam directions among R≥1 radio resource units. In some embodiments, a receiver may demodulate the message only after signals in all R≥1 allocated resources are received. Because according to this example the second type of traffic is transmitted using IQ modulation, the second type of traffic may be demodulated by the receiver essentially immediately after the signal transmitted for that resource unit is received. Thus, the second type of traffic may be demodulated and decoded earlier than the first type of traffic, which may be beneficial for scenarios with tighter latency requirements.

In some embodiments, each of two types of traffic may be communicated (e.g., transmitted) with different schemes that may co-exist in the same time-frequency radio resource without affecting (or, e.g., jeopardizing) the performance of the other scheme. Thus, in accordance with some embodiments, the two types of traffic may be multiplexed using non-orthogonal resources.

Figure 4:
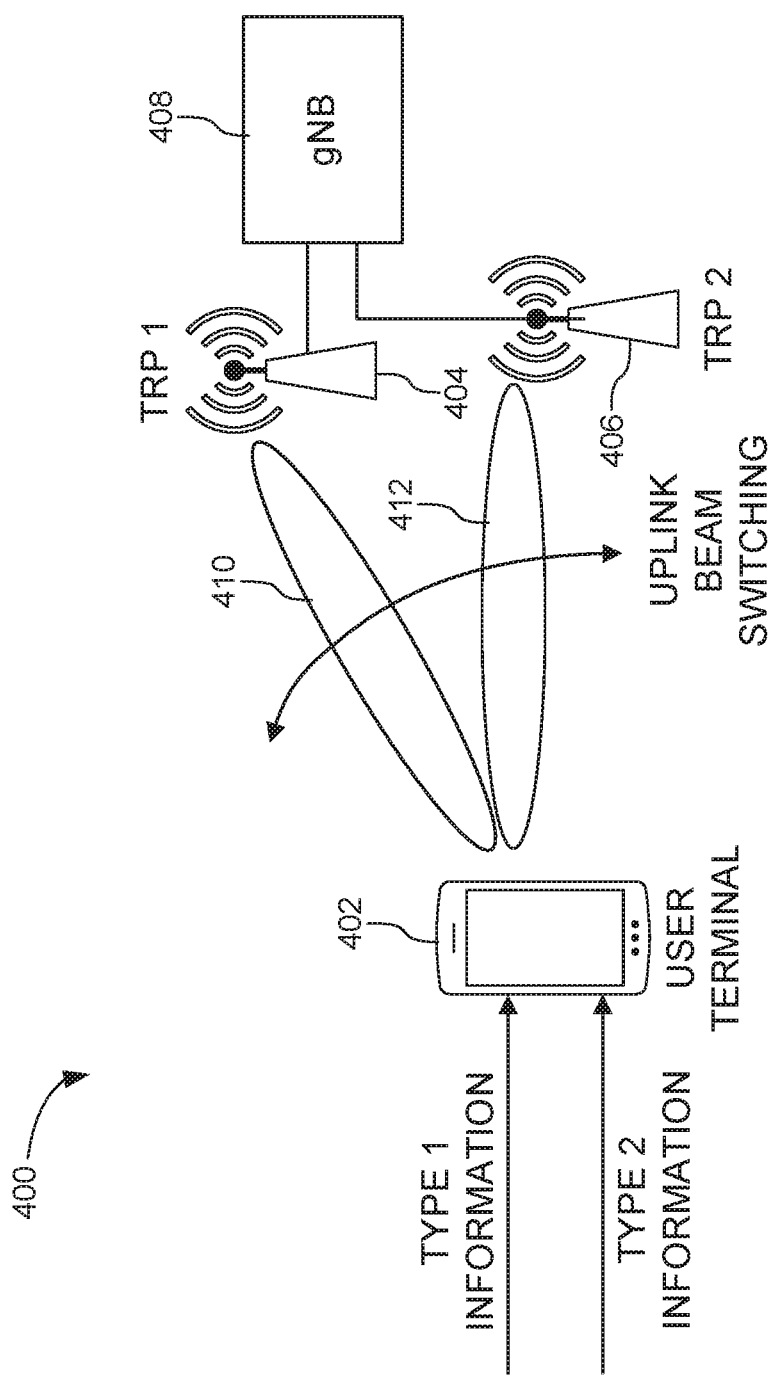
FIG. 4 is an example system arrangement illustrating transmitting uplink beams to multiple transmit/receive points (TRPs), in accordance with some embodiments.

FIG. 4 is an example system arrangement 400 illustrating transmitting uplink beams to multiple transmit/receive points (TRPs), in accordance with some embodiments. In FIG. 4, a first type of information (denoted as "TYPE 1 INFORMATION") may be transmitted using beam direction modulation by a UE 402 to two TRPs 404 and 406 (coupled to a gNB 408) using uplink beams 410 and 412 steered in two different directions (e.g., via the use of precoding).

Although not explicitly shown in FIG. 4, the two beam directions may have been, in some embodiments, determined via a configuration process in which the UE 402 transmits multiple uplink reference signals, such as multiple SRSs, each in a respective different beam direction, and subsequently receives indications from the gNB 404 of (e.g.) two or more beam directions (e.g., via corresponding SRIs) selected by the gNB 404 as being suitable (e.g., having a sufficient signal quality (e.g., an RSRQ higher than −15 dB)) for uplink transmission.

A second type of information (denoted as "TYPE 2 INFORMATION" may be transmitted by the UE 402 using IQ modulation (e.g., an OFDM modulation scheme). In some embodiments, instead of the TRPs 402 and 404, a base station, such as the gNB 406, may be equipped with multi-panel antennas or configured with multiple non-collocated TRPs. Examples of uplink information types may be delay-sensitive and delay-tolerable information types, data and control information types, and payload and redundant parity bit information types. However, in other examples, different kinds of, e.g., heterogenous information types may be possible.

Figure 5:
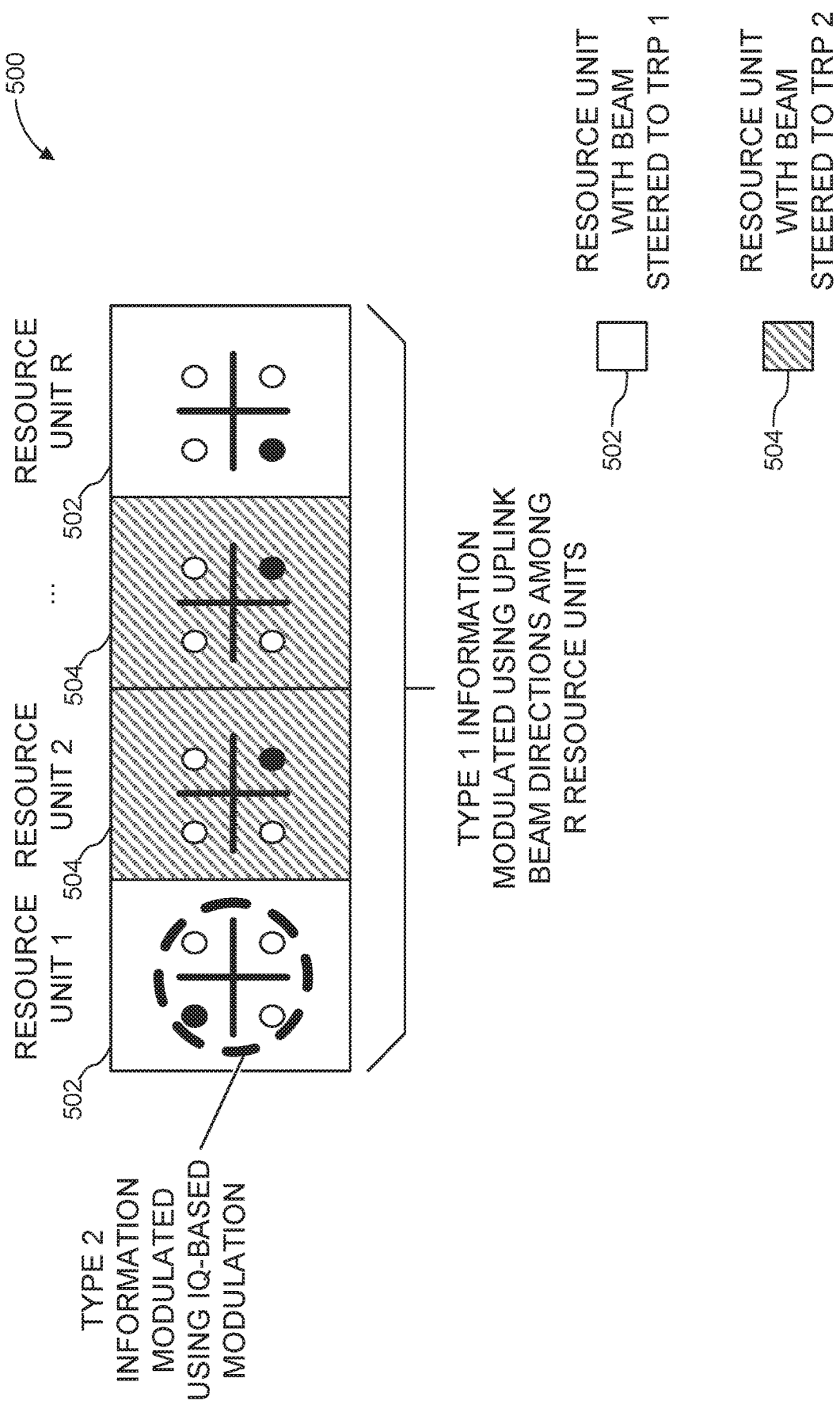
FIG. 5 is an example block diagram illustrating modulating of two heterogenous types of information with different modulation schemes, in accordance with some embodiments.

FIG. 5 is an example block diagram 500 illustrating modulating of two heterogenous types of information with different modulation schemes, in accordance with some embodiments. FIG. 5 shows allocation of a first type of information (denoted as "TYPE 1 INFORMATION") modulated using uplink beam directions among R resource units 502 and a second type of information (denoted as "TYPE 2 INFORMATION") modulated using IQ-based modulation (such as, for example, QPSK). In some embodiments, a base station (e.g., a gNB) may demodulate the two traffic types based on how the traffic types are modulated. In the example of FIG. 5, in some embodiments, some resource units 502 may be steered to transmit beams towards TRP 1, and some resource units 504 may be steered to transmit beams towards TRP 2. Namely, as shown in the example of FIG. 5, the resource units 502 represent resource units with a beam steered to a TRP 1, and the resource units 504 represent resource units with a beam steered to a TRP 2. The second type of information, or more particularly I/Q modulation symbols as generally illustrated in FIG. 5, may be at the same time transmitted on uplink beams used to modulate the first type of information.

Figure 6:
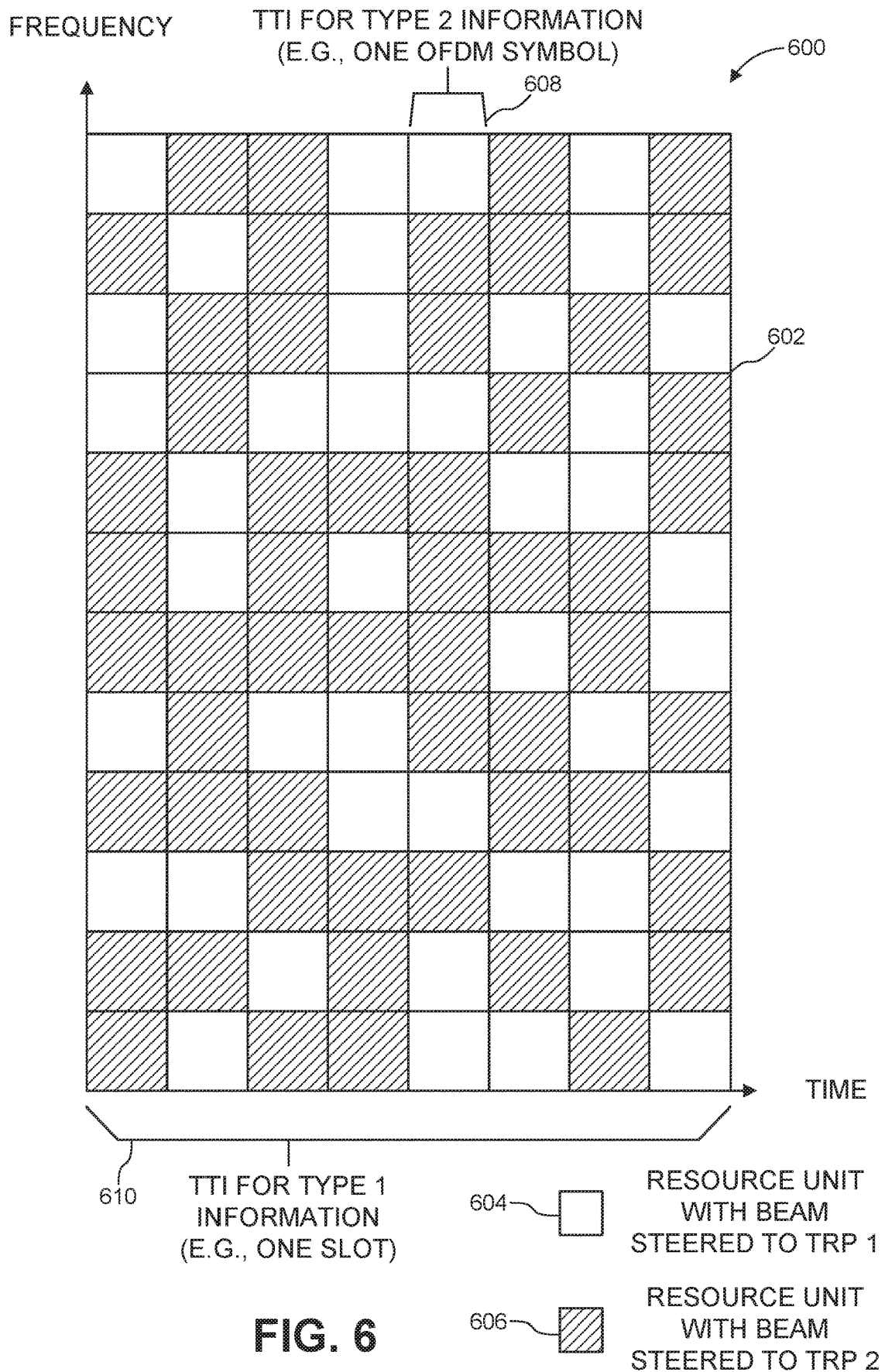
FIG. 6 is an example time-frequency plane illustrating modulating of two types of information across the time-frequency plane, in accordance with some embodiments.

FIG. 6 is an example block time-frequency plane 600 illustrating modulating of two different types of information across the time-frequency plane, in accordance with some embodiments. FIG. 6 shows some example embodiments that extend modulation to a two-dimensional time-frequency grid 602. As shown in the example of FIG. 6, resource units 604 represent resource units with a beam steered to a TRP 1, and resource units 606 represent resource units with a beam steered to a TRP 2. In some embodiments, TTIs (transmission time intervals) may be defined differently for two different types of information. Hence, demodulating of data corresponding to these different types of information may not occur synchronously. As shown in FIG. 6, an overlap between TTIs 608 and 610 may exist. Nevertheless, even if modulating of those different types of information is performed synchronously, interference may be avoided. More specifically, Type 1 information may be modulated by sequencing (e.g., switching) beam directions, and hence any potential interference may be removed even if the same radio resources are used for transmission of the two types of information at the same time. Resource allocation (e.g., a number of OFDM symbols per TTI and a number of subcarriers) for the two types of information may be, e.g., pre-defined and communicated between a user terminal and a base station, such as a gNB, with the user terminal and the gNB modulating and demodulating them accordingly. For some embodiments, Type 1 information may be modulated by beam directions among each resource element (RE) (e.g., subcarrier) within a TTI (e.g., the TTI 610, as in FIG. 6) corresponding to the Type 1 information. Type 2 information may be modulated by IQ modulation in each RE (e.g., subcarrier) within a TTI (e.g., the TTI 608, as in FIG. 6) corresponding to the Type 2 information.

With respect to demodulation at a receiver, in some embodiments, a channel response measured at each of the TRPs may be collected and recorded by a centralized entity, as is described in more detail, e.g., below. In general, in some embodiments, uplink beam directions across multiple resource units in one TTI for a first type of traffic may be identified for the purpose of demodulation. For a second type of traffic, in some embodiments, the centralized entity may demodulate a received signal (e.g., modulated with an IQ modulation scheme) using any suitable demodulation technique, e.g., as known in the art.

An example transmitter processing chain, in accordance with some embodiments, will now be described.

Figure 7:
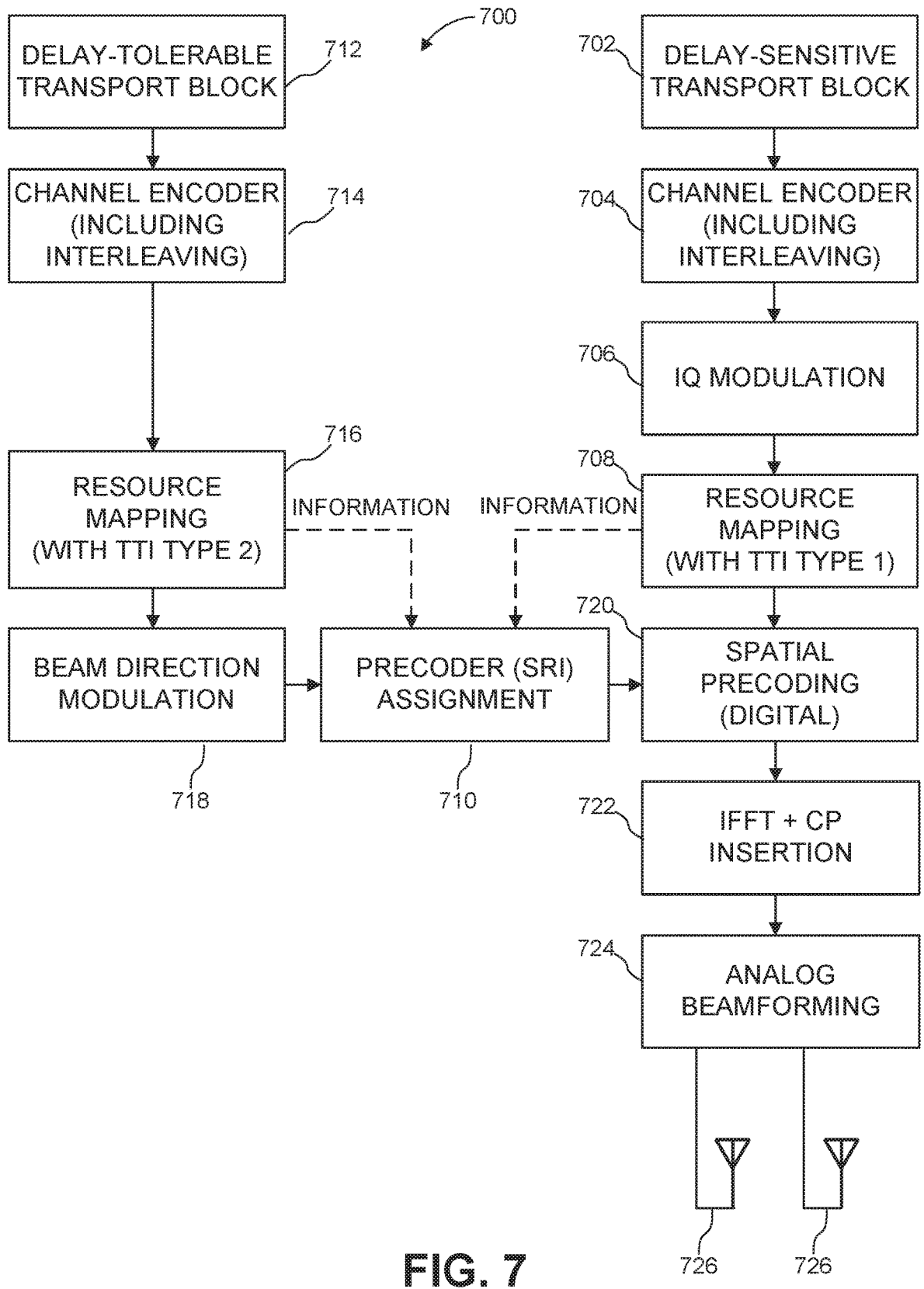
FIG. 7 is a block diagram illustrating an example process, in accordance with some embodiments.
Figure 8:
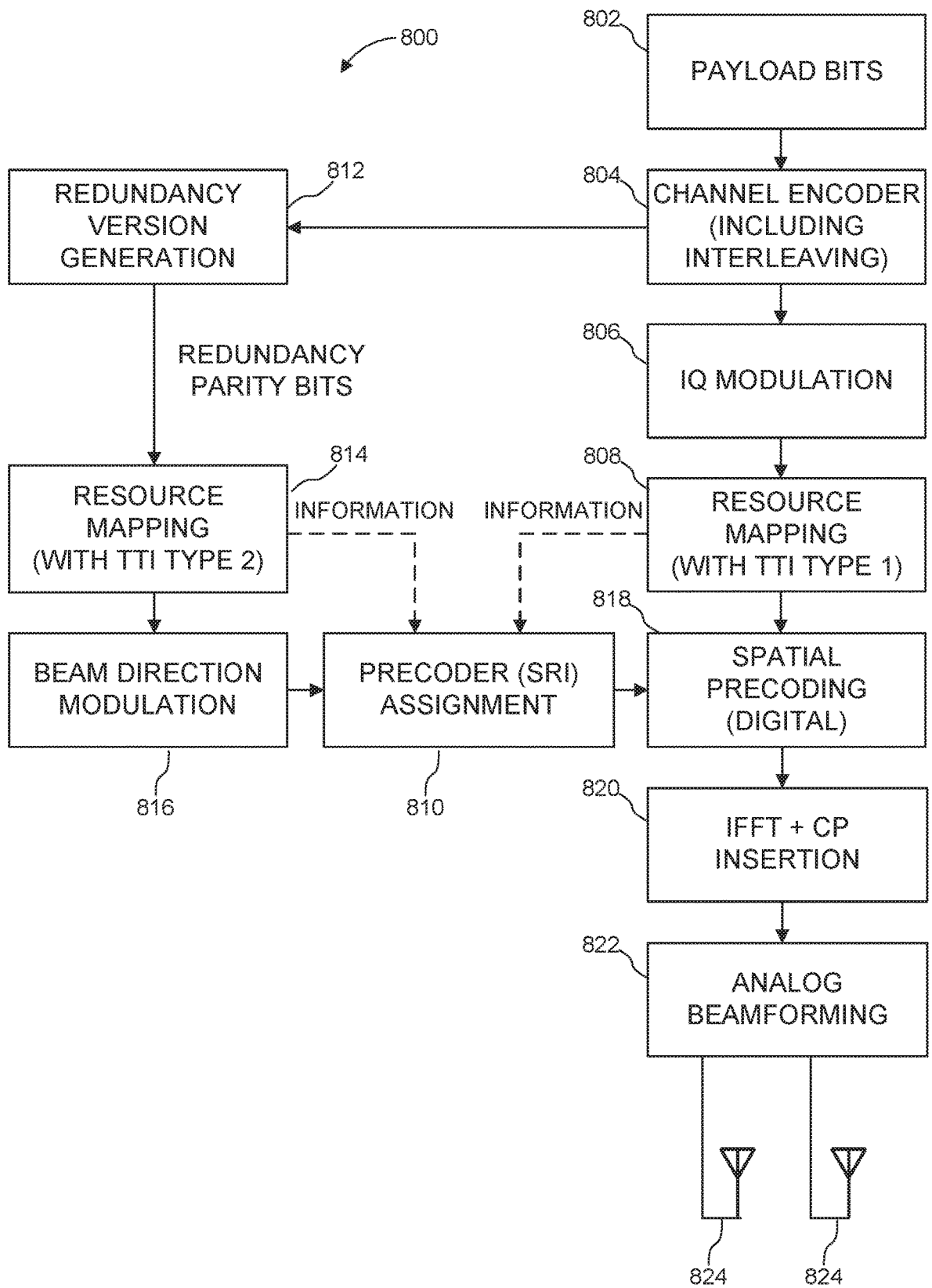
FIG. 8 is a block diagram illustrating another example process, in accordance with some embodiments.

FIG. 7 is a block diagram illustrating an example process 700, in accordance with some embodiments. The example process 700 of FIG. 7 illustrates example processing branches for an example process of transmitting, including processing and multiplexing, delay-sensitive and delay-tolerable transport block uplink information types, in accordance with some embodiments. FIG. 8 is a block diagram illustrating another example process 800, in accordance with some embodiments. The example process 800 of FIG. 8 illustrates example processing branches for an example process of transmitting, including processing and multiplexing, payload and (e.g., redundancy) parity bits uplink information types, in accordance with some embodiments.

In some embodiments, the example processing illustrated in FIGS. 7 and/or 8 may be implemented by a transmitter at a user terminal. Note that, in some embodiments, multiplexing data and control information may be carried out in similar manner as that shown in FIG. 7. In some embodiments, for both FIGS. 7 and 8, different information types (e.g., delay-sensitive information and delay-tolerable information) are processed in parallel processing branches and combined prior to transmitting over an air interface. Further, in some embodiments, modulating the first type of uplink information is performed synchronously with modulating the second type of uplink information.

As shown in the example of FIG. 7, delay-sensitive information may be modulated using IQ modulation (e.g., quadrature amplitude modulation (QAM)), and delay-tolerable information may be transmitted based on modulation utilizing beam directions as described above.

More specifically, in the example processing branch for a delay-sensitive traffic, at block 702, a transport block for the delayed-sensitive sensitive information may be formed. Delay-sensitive information may be channel encoded, interleaved, and modulated with IQ-modulation. More specifically, at block 704, channel encoding and interleaving may be applied to the transport block for the delay-sensitive information. At block 706, the coded delay-sensitive information may be modulated using a suitable IQ modulation scheme, such as, e.g., QAM modulation. At block 708, the modulated delay-sensitive information (here IQ modulation symbols) may be mapped to resource unit(s) (e.g., subcarrier frequencie(s) and/or time slots) allocated for transmission with a TTI corresponding to the delay-sensitive type of traffic (denoted in FIG. 7 as "TTI Type 1"). Information regarding the allocated resources for the modulated delay-sensitive information may be supplied for precoder (SRI) assignment processing, at block 710. In some embodiments, some possible examples of such information include, without limitation, a number of resources, time and frequency indexes (e.g., start and finish) of the resources, a sub-carrier spacing adopted in these resources, etc.

In the example processing branch for a delay-tolerable traffic, at block 712, a transport block for the delay-tolerable information may be formed. At block 714, channel encoding and interleaving may be applied to the transport block for the delay-tolerable information. At block 716, the coded delay-tolerable information bits may be mapped to pre-allocated resource units with a TTI corresponding to the delay-tolerable type of traffic (denoted in FIG. 7 as "TTI Type 2"). Information regarding the allocated resources for the delay-tolerable information may be supplied to the precoder (SRI) assignment processing, at block 710. In some embodiments, some possible examples of such information include, without limitation, a number of resources, time and frequency indexes (e.g., start and finish) of the resources, a sub-carrier spacing adopted in these resources, etc.

Further, at block 718, the coded delay-tolerable information bits may be modulated via beam direction modulation, where the bits may be mapped to uplink beam directions (which may be, e.g., selected from a set of pre-configured SRIs) across the pre-allocated resource units, as described in more detail, e.g., above.

Note that, although not explicitly shown in FIG. 7, in some embodiments, the uplink beam directions used for beam direction modulation may have been pre-determined in advance via an initial configuration process in which a base station (e.g., a gNB) selects multiple uplink beam directions for beam direction modulation based on received multiple SRSs, and supplies indications of the selected uplink beams (e.g., beam directions) via SRIs to a user terminal (e.g., a UE).

The decisions on a selection of the beam directions may be sent from the beam direction modulation block 718 to the precoder (SRI) assignment processing block 710. The precoder (SRI) assignment processing block 710 may include a beamforming weights (e.g., precoder) construction module for the delay-sensitive information, and may calculate digital and/or analog beamforming matrices for the corresponding resource units accordingly. In some embodiments, both digital and analog beamforming modules (as applicable) may be affected if hybrid beamforming is used (as shown in FIG. 7). In some embodiments, the precoder (SRI) assignment processing block 710 outputs are sent to a spatial (e.g., digital) precoder at block 720, which then sends spatially-precoded data to an IFFT+CP (Inverse Fast Fourier Transform and Cyclic Prefix) insertion processing at block 722. An analog beamforming (e.g., processing) block 724 may receive the outputs from the IFFT+CP insertion processing block 722 and may send signals to one or more antennas 726 for transmission.

As noted above, in some embodiments, a UE may multiplex uplink data payload and redundant coded bits associated with the uplink data payload to reduce latency caused by a HARQ (a Hybrid Automatic Repeat Request) retransmission. If there is an error detected in an uplink transport block, a gNB may use multiplexed additional redundancy to decode the uplink transport block without sending a request for re-transmission. In some embodiments, the uplink data payload may be modulated using a suitable IQ modulation scheme, such as, e.g., QAM modulation, and the additional (e.g., redundancy) parity bits may be transmitted based on beam direction modulation.

Referring now to FIG. 8, in some embodiments, in the example processing branch for uplink data payload, at block 802, a transport block of uplink data payload (e.g., bits) may be formed. In some embodiments, the data payload bits may be channel encoded, interleaved, and modulated with IQ modulation (e.g., QAM modulation). More specifically, at block 804, channel encoding and interleaving may be applied to the transport block of the data payload. At block 806, the coded data payload bits may be modulated using a suitable IQ modulation scheme, such as, e.g., QAM modulation. At block 808, the modulated payload bits may be mapped to resource unit(s) allocated for transmission with a TTI corresponding to the data payload (denoted in FIG. 8 as "TTI Type 1"). Information regarding the allocated resource(s) for the modulated payload bits may be supplied to precoder (SRI) assignment processing, at block 810. Similar to the example of FIG. 7, in some embodiments, some possible examples of such information include, without limitation, a number of resources, time and frequency indexes (e.g., start and finish) of the resources, a sub-carrier spacing adopted in these resources, etc.

At block 812, at least one redundancy version (e.g., additional parity bits) may be generated from the coded payload bits and sent to the rest of an example processing branch for the additional (redundancy) parity bits using beam direction modulation. At block 814, the additional parity bits may be mapped to uplink beam directions (e.g., selected from a set of pre-configured SRIs) across pre-allocated resource units for transmission with a TTI corresponding to the additional parity bits (denoted in FIG. 8 as "TTI Type 2"). Information regarding the allocated resources for the additional parity bits may be supplied to the precoder (SRI) assignment processing, at block 810. In some embodiments, the information regarding the allocated resources may be as described above. Further, at block 816, the additional parity bits may be modulated via beam direction modulation.

The decisions on a selection of the beam directions may be sent to the precoder (SRI) assignment processing, at block 810, which includes a beamforming weights (e.g., precoder) construction module for the payload data coded bits. The precoder (SRI) assignment processing block 810 may determine (e.g., derive) digital and/or analog beamforming matrices for the corresponding resource units accordingly. In some embodiments, both digital and analog beamforming modules (as applicable) may be affected if hybrid beamforming is used (as shown in FIG. 8). In some embodiments, the precoder (SRI) assignment processing block 810 outputs are sent to a spatial (e.g., digital) precoder at block 818, which then sends spatially-precoded data to an IFFT+CP insertion processing at block 820. An analog beamforming module (e.g., processing) block 822 may receive the outputs from the IFFT+CP insertion processing block 820 and may send signals to one or more antennas 824 for transmission. In some embodiments, a user terminal may use precoding to transmit in a direction of, e.g., a TRP.

An example receiver processing chain, in accordance with some embodiments, will now be described.

Figure 9:
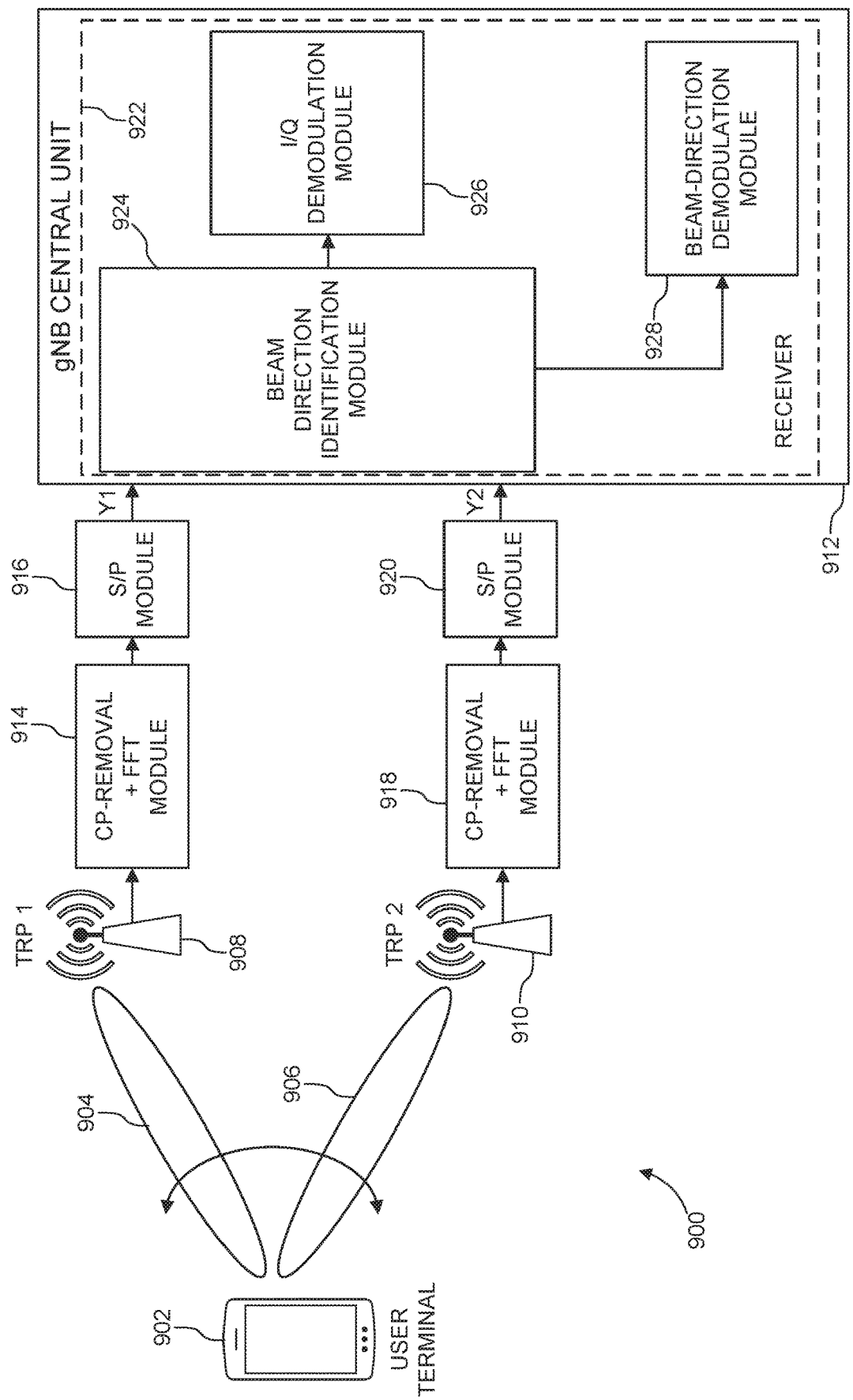
FIG. 9 is an example system diagram illustrating demodulating multiplexed uplink received signals modulated with IQ-based modulation and beam direction modulation, in accordance with some embodiments.

FIG. 9 is an example system diagram illustrating demodulating multiplexed uplink received signals modulated with IQ-based modulation and beam direction modulation (e.g., for identified beam directions among subcarriers), in accordance with some embodiments. FIG. 9 shows a receiver processing chain (e.g., network side processing) according to some embodiments. While the example system diagram of FIG. 8 assumes that two TRPs are selected to receive uplink signals, in some embodiments, a different number of TRPs may be used instead. Further, instead of the TRPs as shown, the system of FIG. 9 may, in some embodiments, utilize multiple antenna panels instead. Yet further, the example of FIG. 9 assumes that an OFDM modulation scheme (and hence IQ-based modulation scheme) is used for transmission of at least one type of traffic. However, in some embodiments, the principles described in connection with FIG. 9 may be applicable in other scenarios in which beam direction modulation is used in conjunction with other type(s) of IQ-based modulation schemes.

Referring to FIG. 9, an uplink signal is transmitted by a user terminal (e.g., a UE) 902. As shown in FIG. 9, the uplink signal may be transmitted using two beams 904 and 906 directed in two different directions towards TRPs 908 and 910, respectively. The uplink signal may be conveyed to a gNB 912 via the TRP 908 and the TRP 910, received by the gNB 912 and processed accordingly. In some embodiments, each OFDM symbol may be received as shown in FIG. 9. In some embodiments, each of the TRPs 908 and 910 may perform CP removal and Fast Fourier Transformation (FFT) using a CP-Removal+FFT module 914 and a CP-Removal+FFT module 918, respectively, and a serial-to-parallel (S/P) operation using an S/P converter module 916 and an S/P converter module 920, respectively, to obtain a frequency-domain received signal for each OFDM symbol.

Subsequently, as shown in FIG. 9, two different versions of received signals (denoted as Y1 and Y2, respectively, in FIG. 9) are received (or, e.g., collected) by a gNB central unit. In some embodiments, the received signals Y1 and Y2 may be combined and analyzed to derive (e.g., identify), for each subcarrier, a TRP beam direction used by the user terminal 902. In other words, for each subcarrier used for transmission of a given OFDM symbol, the gNB 912 may determine which of the uplink beams 904 (here directed towards the TRP 908) and 906 (here directed towards the TRP 910) was used for signal transmission on that subcarrier. In some embodiments, beam direction identification may include comparing received signal strength on the same subcarrier for Y1 and Y2. In some embodiments, a receiver 922 at the gNB 912 may include a beam direction identification module 924 that, based on Y1 and Y2, identifies beam directions used across given resource unit(s), such as among the sub-carriers. For example, the beam direction identification module 924 may identify a respective beam direction by performing signal strength comparison measurements using Y1 and Y2.

In some embodiments, using the identified uplink beam directions among the subcarriers, an I/Q demodulation (e.g., a QAM demodulation) module 926 of the receiver 922 may demodulate IQ-modulated signal carried on each subcarrier. In one example, the module 926 may demodulate a QAM-conveyed (information) signal on each subcarrier based on either Y1 or Y2. To illustrate, in the example of FIG. 9, for a given subcarrier, if the beam 904 directed toward the TRP 908 has been identified, the received signal of the subcarrier of Y1 (conveyed via the TRP 908) may be used for demodulation at the receiver 922. If the beam 906 directed toward the TRP 910 has been identified on the given subcarrier, the received signal of the subcarrier of Y2 (conveyed via the TRP 910) may be used for demodulation.

For information conveyed by beam direction modulation, in some embodiments, the information may be demodulated by a beam-direction demodulation module 928 separately once the beam directions across all of the allocated resource units (e.g., subcarriers, as in the present example embodiment) are identified. More specifically, the identified beam directions across all of the allocated resource units (e.g., subcarriers) may be collected and, e.g., recorded (e.g., stored) by the beam-direction demodulation module 928. Using this information, the beam-direction demodulation module 928 may be able to determine an uplink beam direction pattern applied among the allocated uplink radio resources (e.g., how the beams 904 and 906 were switched or selected across the resource units) to demodulate data modulated with the beam direction modulation. In some embodiments, a configuration of the modulation and coding scheme used for both the beam direction modulation and the IQ-based (e.g., QAM) modulation, may provide the gNB with information on, e.g., how many bits are modulated, etc. for each traffic type. Note that, although not explicitly shown in FIG. 9, in some embodiments, such configuration may have been already communicated between the UE 902 and the gNB 912 as a part of an initial configuration process.

Example system procedures, in accordance with some embodiments, will now be described.

Figure 10:
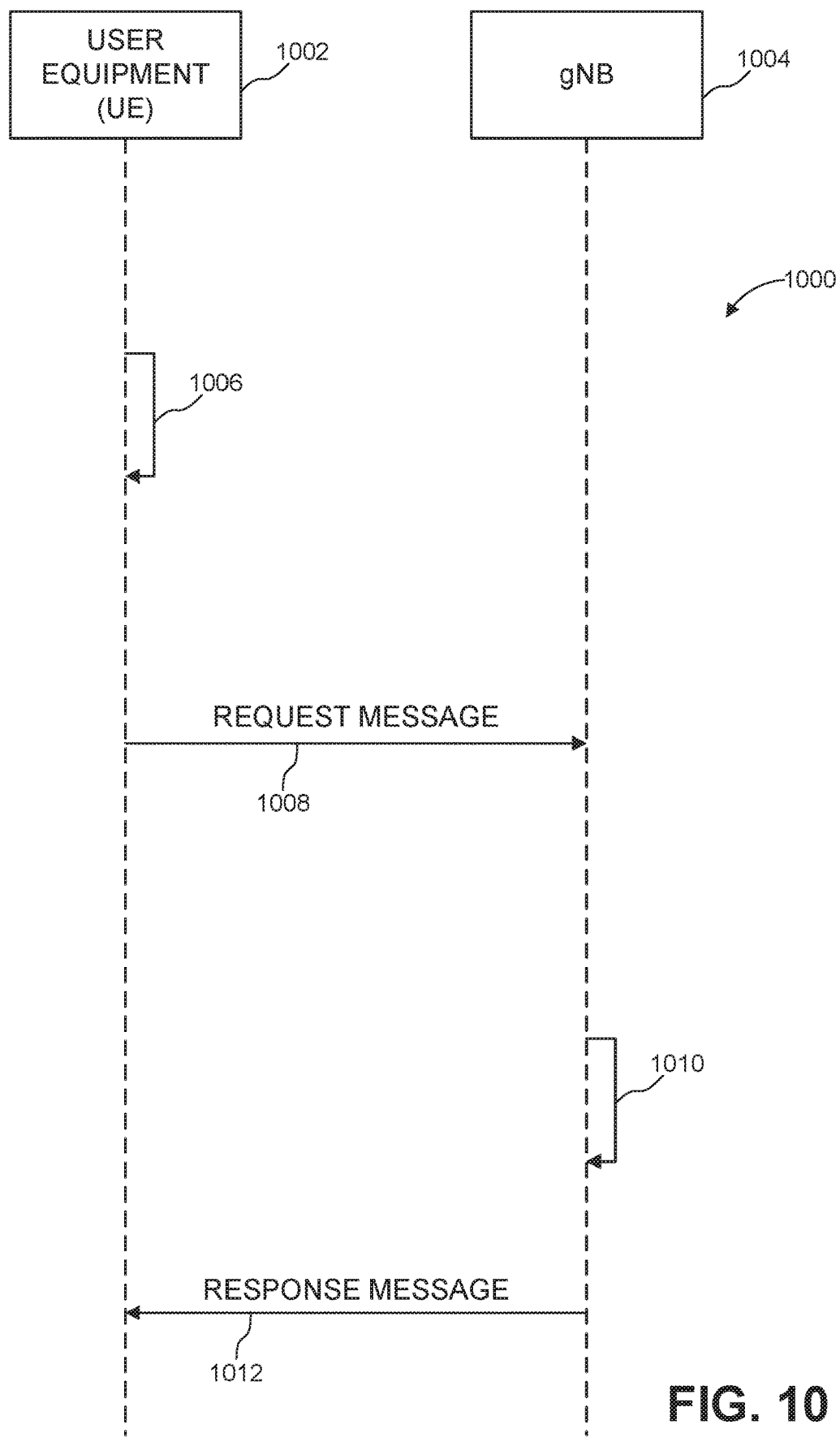
FIG. 10 is an example message sequencing diagram for requesting beam-based multiplexing, in accordance with some embodiments.

FIG. 10 is an example message sequencing diagram 1000 for requesting beam-based multiplexing, in accordance with some embodiments. In some embodiments, configuration messages may be exchanged between a gNB 1004 and a UE 1002, as illustrated by FIG. 10. At 1006, the UE 1002 performs an evaluation to determine whether to use beam-based uplink multiplexing (e.g., has a system need, benefit, and/or relative efficiency been identified). The evaluation may depend on software applications running on the UE 1002. For example, vehicles that run both delay-sensitive car safety applications and VoIP applications at the same time may benefit from a UE (the vehicle in this case) multiplexing different types of traffic that originates from these two applications. For such a scenario, the vehicle may determine (e.g., in accordance with one or more criteria) that beam-based uplink multiplexing should be used.

If the UE 1002 determines that beam-based uplink multiplexing should be requested (e.g., based on a need or potential benefit), at 1008, the UE 1002 may send a request message to the gNB 1004 via a physical-layer control signal (e.g., a signal sent on PUCCH or an enhanced e(PUCCH)) or a higher-layer control signal (e.g., an RRC_ReConfiguration message). Such a message may include indication(s) of types of information that the UE 1002 requests to multiplex (e.g., delay-sensitive vs. delay-tolerable information, control vs. data information, or payload vs. redundancy information).

If the gNB 1004 receives such a request from the UE 1002, at 1010, the gNB may determine (e.g., evaluate) e.g., suitability to initialize the requested multiplexing method. Since, in some embodiments, the requested method utilizes a dense deployment of TRPs, the gNB 1004 may analyze context information to decide whether the multiplexing request should be granted. In some embodiments, the context information may include a location of the UE 1002 and a deployment density of TRPs in an area surrounding the UE 1002. If the decision is positive, at 1012, the gNB 1004, may send a response message to the UE 1002 and notify the UE 1002 to enter the requested mode of operation. If the decision is negative, the gNB may send to the UE 1002 a response message that refuses the request.

Figure 11:
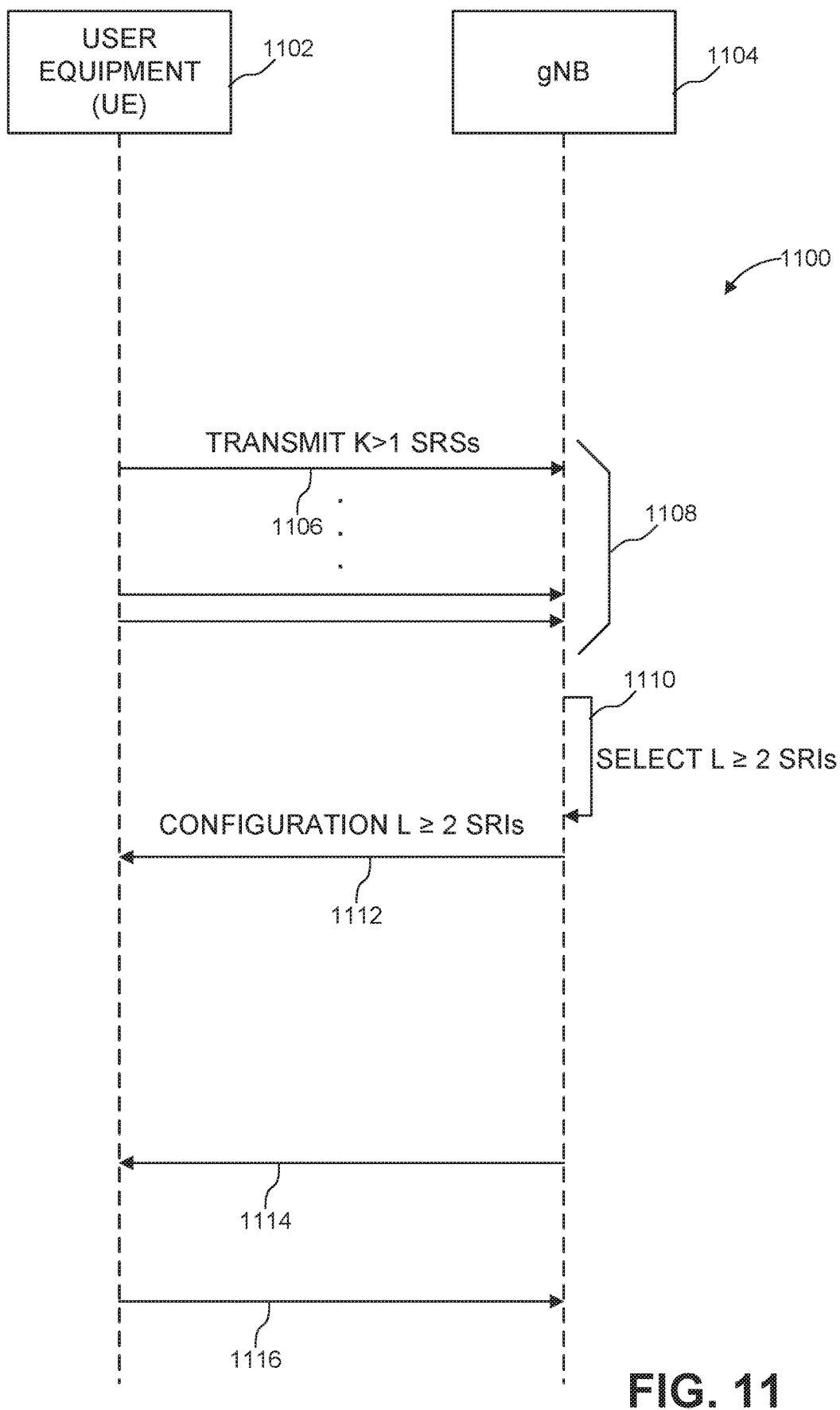
FIG. 11 is an example message sequencing diagram for configuring beam-based multiplexed transmission scheme for use between a user equipment (UE) and a gNB (next Generation NodeB), in accordance with some embodiments.

FIG. 11 is an example message sequencing diagram 1100 for configuring a beam-based multiplexed transmission scheme for use between a UE and a gNB, in accordance with some embodiments. In some embodiments, as described above, once (e.g.) a need to multiplex different types of uplink traffic has been identified at a UE 1102 and a request to do so has been granted by a gNB 1104, the UE 1102 and the gNB 1104 may proceed as illustrated, by way of example, in FIG. 11. Namely, similar to what is specified in 5G NR, at 1106, the gNB 1104 configures K>1 SRS resources for the UE 1102 to send an SRS in different directions (with different beams) via downlink control signaling (such as, e.g., an RRC_ReConfiguration message). At 1108, the UE 1102 may transmit the SRSs on the different configured radio resources. In some embodiments, the gNB 1104 may indicate to the UE 1102, via control signals, that given beam directions are suitable for uplink transmission. In some embodiments, the beam directions may be considered suitable if the beams received have, as a non-limiting example, an RSRQ higher than −15 dB. The gNB 1004 may configure sufficient number of SRS resources so that at least two different suitable beam directions (e.g., beams with a sufficient RSRQ signal value) are identified.

In some embodiments, based on measurements of the K>1 precoded SRSs, at 1110, the gNB 1104 selects L≥2 out of the K beam directions (e.g., based on measured uplink signal quality at different TRPs or antenna panels). Further, in some embodiments, at 1112, the indications of the selection results may be sent by the gNB 1104 to the UE 1002 with multiple SRIs communicated via downlink control channel (e.g., via PDCCH or an enhanced PDCCH (ePDCCH)) or higher-layer control signaling (e.g., an RRC_ReConfiguration message).

In addition to the L≥2 SRIs sent by the gNB 1104, at 1114, the gNB 1104 (e.g., network side) may indicate to the UE 1102 a resource allocation and a number of resource units for beam direction modulation, which may be used by the UE 1102 to modulate information (e.g., at least one traffic type) based on beam direction over the assigned radio resources accordingly. Additionally, the gNB 1104 may instruct the UE 1102 if the beam directions for modulation may be applied in the time-domain only, in the frequency domain only, or across the allocated time-frequency resource grid (e.g., the whole time-frequency resource grid, as in LTE, for example). These configuration signals may be communicated via downlink control signaling (e.g., PDCCH or ePDCCH signaling) along with an uplink grant.

With the configured parameters and information provided by the gNB 1104, at 1116, the UE 1102 may begin uplink transmission by applying beam-based multiplexing using the assigned radio resources.

Figure 12:
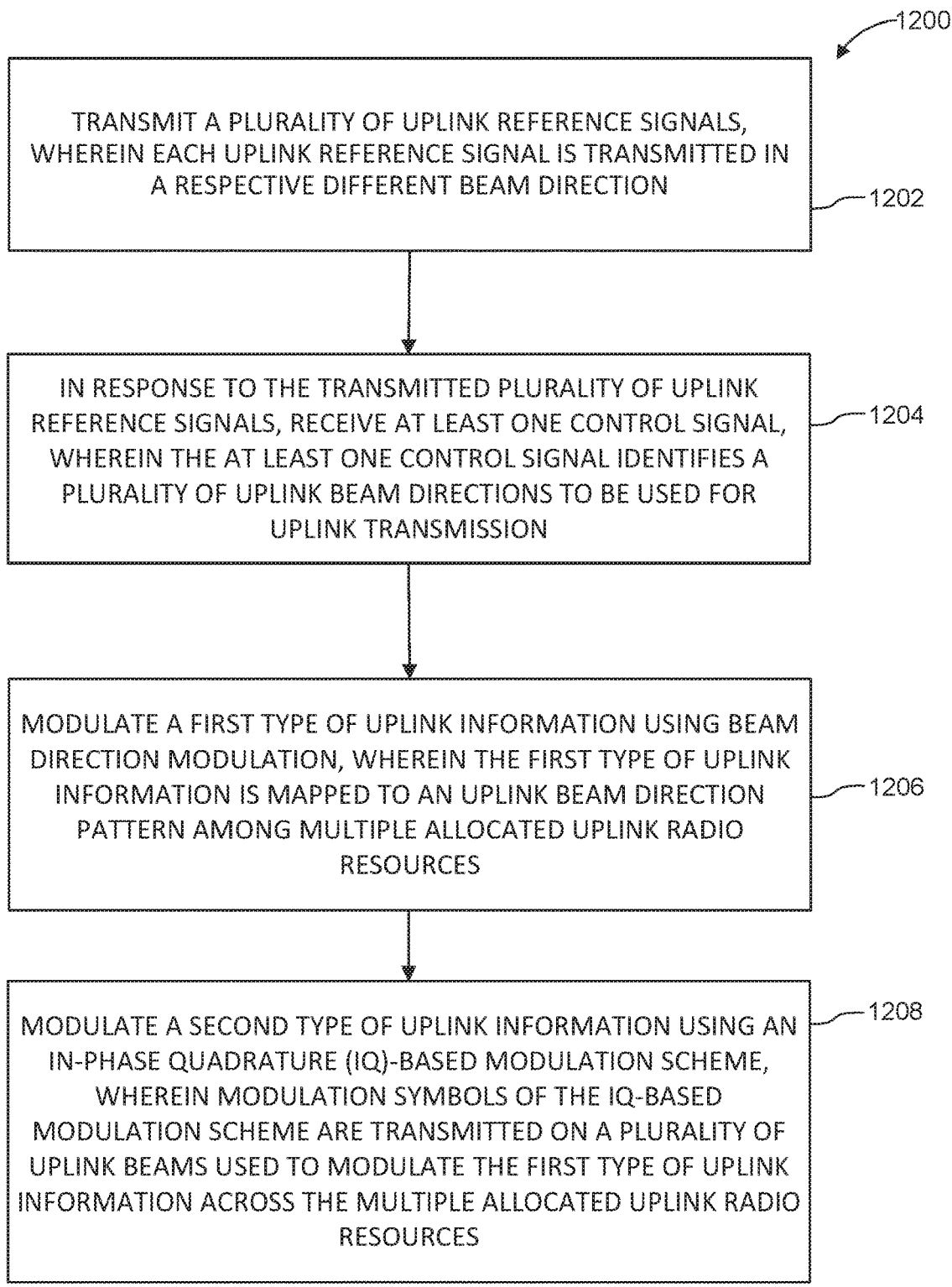
FIG. 12 is a flow chart illustrating an example method for use of beam direction modulation and an in-phase quadrature (IQ)-based modulation scheme, in accordance with some embodiments.

FIG. 12 is a flow chart 1200 illustrating an example method for use of beam direction modulation and IQ-based modulation scheme, in accordance with some embodiments. In some embodiments, the method is performed by a WTRU (wireless transmit/receive unit). At step 1202, the WTRU transmits a plurality of uplink reference signals, wherein each uplink reference signal is transmitted in a respective different beam direction. At step 1204, in response to the transmitted plurality of uplink reference signals, the WTRU receives at least one control signal, wherein the at least one control signal identifies a plurality of uplink beam directions to be used for uplink transmission. At step 1206, the WTRU modulates a first type of uplink information using beam direction modulation, wherein the first type of uplink information is mapped to an uplink beam direction pattern among multiple allocated uplink radio resources. Then, at step 1208, the WTRU modulates a second type of uplink information using an in-phase quadrature (IQ)-based modulation scheme, wherein modulation symbols of the IQ-based modulation scheme are transmitted on a plurality of uplink beams used to modulate the first type of uplink information across the multiple allocated uplink radio resources.

Figure 13:
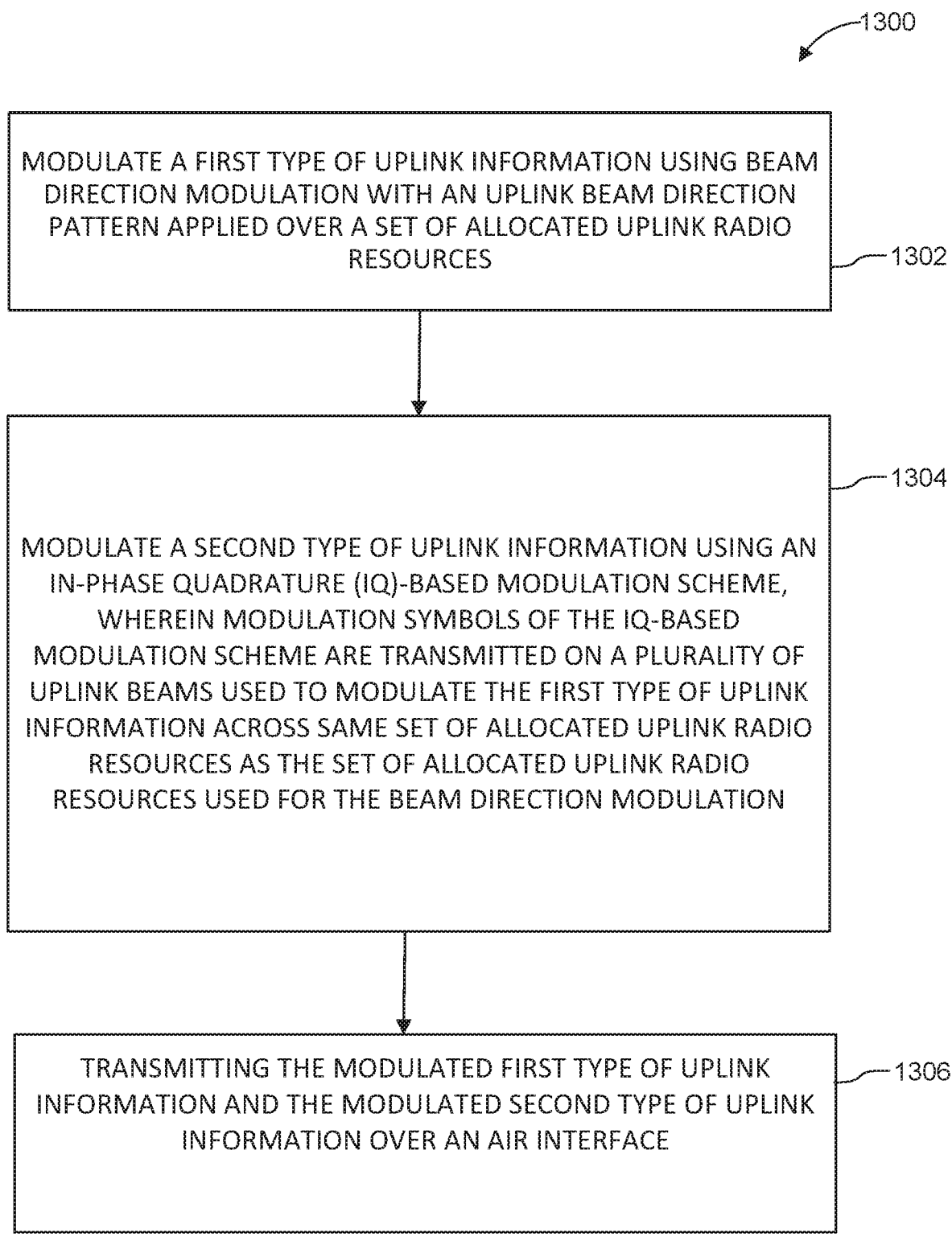
FIG. 13 is a flow chart illustrating another example method for use of beam direction modulation and an in-phase quadrature (IQ)-based modulation scheme, in accordance with some embodiments.

FIG. 13 is a flow chart 1300 illustrating another example method for use of beam direction modulation and an in-phase quadrature (IQ)-based modulation scheme, in accordance with some embodiments. In some embodiments, the method is performed by a WTRU (wireless transmit/receive unit). At step 1302, the WTRU modulates a first type of uplink information using beam direction modulation with an uplink beam direction pattern applied over a set of allocated uplink radio resources. At step 1304, the WTRU modulates a second type of uplink information using an in-phase quadrature (IQ)-based modulation scheme, wherein modulation symbols of the IQ-based modulation scheme are transmitted on a plurality of uplink beams used to modulate the first type of uplink information across same set of allocated uplink radio resources as the set of allocated uplink radio resources used for the beam direction modulation, wherein modulating the first type of uplink information is performed synchronously with modulating the second type of uplink information.

Further, various (e.g., related) embodiments have been described hereinabove.

According to some embodiments, an uplink transmission method capable of multiplexing two different types of traffic using non-orthogonal radio resources is disclosed, where the method conveys a first type of traffic information based on uplink beam directions among multiple radio resource units and conveys a second type of traffic information using conventional IQ modulation symbols to be carried by the uplink beams.

According to some embodiments, a disclosed processing chain at a transmitter (and at a receiver) capable of realizing an uplink multiplexing (and demultiplexing) method may map a first type of traffic information to a spatial processing pattern and may map a second type of traffic information to IQ modulation symbols. For some embodiments, a message exchange procedure may be used to initialize configuration of the uplink multiplexing method.

According to some embodiments, a method, performed at a wireless transmit/receive unit (WTRU), may include: transmitting an uplink beam direction pattern applied over a set of allocated uplink radio resources, wherein the uplink beam direction pattern communicates uplink information bits.

According to some embodiments, a method, performed at a receiver, may include: receiving a first uplink radio frequency (RF) signal from a first transmit/receive point (TRP); receiving a second uplink radio frequency (RF) signal from a second TRP; identifying a first beam direction from the first uplink radio frequency (RF) signal; identifying a second beam direction from the second uplink radio frequency (RF) signal; and demodulating information conveyed using uplink beam modulation based on the first beam direction and the second beam direction; demodulating a first set of in-phase quadrature (IQ)-modulated information based on the first beam direction; and demodulating a second set of in-phase quadrature (IQ)-modulated information based on the second beam direction.

According to some embodiments, a device (e.g., a receiver), may include: a processor; and a non-transitory computer-readable medium storing instructions that are operative, when executed on the processor, to perform processes including: receiving a first uplink radio frequency (RF) signal from a first transmit/receive point (TRP); receiving a second uplink radio frequency (RF) signal from a second TRP; identifying a first beam direction from the first uplink radio frequency (RF) signal; identifying a second beam direction from the second uplink radio frequency (RF) signal; and demodulating information conveyed using uplink beam modulation based on the first beam direction and the second beam direction; demodulating a first set of in-phase quadrature (IQ)-modulated information based on the first beam direction; and demodulating a second set of in-phase quadrature (IQ)-modulated information based on the second beam direction.

According to some embodiments, a method, performed at a wireless transmit/receive unit (WTRU), may include: transmitting at least two uplink Sounding Reference Signals (SRSs), each in a unique direction; in response to the transmitted at least two SRSs, receiving at least one control signal indicating two or more uplink beams with corresponding directions; receiving an allocation of uplink radio resources; modulating a first type of uplink information using beam direction modulation, wherein the first type of uplink information is mapped to an uplink beam direction pattern among the allocated uplink radio resources; and modulating a second type of uplink information using an in-phase quadrature (IQ)-based modulation scheme, wherein modulation symbols of the IQ-based modulation scheme are transmitted on the two or more uplink beams used to modulate the first type of uplink information across the allocated uplink radio resources.

According to some embodiments, a device (e.g., a WTRU), may include: a processor; and a non-transitory computer-readable medium storing instructions that are operative, when executed on the processor, to perform processes including: transmitting at least two uplink Sounding Reference Signals (SRSs), each in a unique direction; in response to the transmitted at least two SRSs, receiving at least one control signal indicating two or more uplink beams with corresponding directions; receiving an allocation of uplink radio resources; modulating a first type of uplink information using beam direction modulation, wherein the first type of uplink information is mapped to an uplink beam direction pattern among the allocated uplink radio resources; and modulating a second type of uplink information using an in-phase quadrature (IQ)-based modulation scheme, wherein modulation symbols of the IQ-based modulation scheme are transmitted on the two or more uplink beams used to modulate the first type of uplink information across the allocated uplink radio resources.

Although features and elements are described herein in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method, performed by a wireless transmit/receive unit (WTRU), comprising:
   transmitting a plurality of uplink reference signals,
   wherein each uplink reference signal is transmitted in a respective different beam direction;
   in response to the transmitted plurality of uplink reference signals, receiving at least one control signal,
   wherein the at least one control signal identifies a plurality of uplink beam directions to be used for uplink transmission;
   modulating a first type of uplink information using beam direction modulation,
   wherein modulating the first type of uplink information using the beam direction modulation comprises selecting, based on the first type of uplink information, a pattern of one or more of the plurality of uplink beam directions for the uplink transmission of one or more allocated uplink radio resources;
   modulating a second type of uplink information using an in-phase quadrature (IQ)-based modulation scheme; and
   transmitting the modulated first type of uplink information and the modulated second type of uplink information over air interface,
   wherein the modulated second type of uplink information is transmitted, using the one or more allocated uplink radio resources, on uplink beams in accordance with the pattern of the one or more of the plurality of uplink beam directions, and
   wherein the pattern of the one or more of the plurality of uplink beam directions is a pattern in a time-frequency domain and comprising selecting, in accordance with the first type of uplink information, an uplink beam direction for each resource element of the allocated uplink radio resources for each transmission time slot.

2. The method of claim 1, wherein each of the plurality of uplink reference signals is a Sounding Reference Signal (SRS).

3. The method of claim 2, wherein the at least one control signal indicates a plurality of Sounding Reference Signal (SRS) reference indicators (SR1s) that identify the plurality of uplink beam directions.

4. The method of claim 1, wherein each of the plurality of uplink beam directions is associated with a signal quality that exceeds a threshold.

5. The method of claim 1, further comprising:
applying precoding to each of the plurality of uplink reference signals to transmit each uplink reference signal in the respective different uplink beam direction.

6. The method of claim 1, wherein the pattern of the one or more of the plurality of uplink beam directions is a pattern of beam directions, and comprises selecting, in accordance with the first type of uplink information, a set of uplink beam directions from the plurality of uplink beam directions for use in a given time period.

7. The method of claim 1, wherein the pattern of the one or more of the plurality of uplink beam directions is a pattern in a frequency domain and comprises selecting a first subset of the allocated uplink radio resources, in accordance with the first type of uplink information, for transmission in a first uplink beam direction, and selecting a second subset of the allocated uplink radio resources, in accordance with the first type of uplink information, for transmission in a second uplink beam direction.

8. The method of claim 1, wherein modulating the first type of uplink information is performed synchronously with modulating the second type of uplink information.

9. The method of claim 1, wherein modulating the first type of uplink information using the beam direction modulation further comprises determining a given number of bits to be transmitted over the one or more allocated uplink radio resources per each beam direction modulation instance.

10. The method of claim 9, wherein the given number of bits to be transmitted are determined based at least in part on a number of the plurality of uplink beam directions, a number of beams that can be transmitted by the WTRU in different beam directions in a same radio resource, and a number of the one or more allocated uplink radio resources.

11. The method of claim 1,
wherein the first type of uplink information comprises delay-tolerable traffic, and
wherein the second type of uplink information comprises delay-sensitive traffic.

12. The method of claim 1,
wherein the first type of uplink information comprises redundancy information, and
wherein the second type of uplink information comprises data payload information.

13. The method of claim 1,
wherein the first type of uplink information comprises control information, and
wherein the second type of uplink information comprises uplink data information.

14. The method of claim 1, wherein the modulated first type of uplink information is transmitted towards two or more transmit/receive elements.

15. The method of claim 14, wherein the two or more transmit/receive elements comprise two or more transmit/receive points (TRPs).

16. The method of claim 14, wherein the two or more transmit/receive elements comprise two or more antenna panels of a multi-panel antenna unit.

17. The method of claim 1, wherein a first transmit time interval (TTI) corresponding to the first type of uplink information is different from a second TTI corresponding to the second type of uplink information.

18. A method, performed by a wireless transmit/receive unit (WTRU), comprising:
modulating a first type of uplink information using beam direction modulation,
wherein modulating the first type of uplink information using the beam direction modulation comprises selecting, based on the first type of uplink information, a pattern of one or more of a plurality of uplink beam directions for the uplink transmission of a set of allocated uplink radio resources;
modulating a second type of uplink information using an in-phase quadrature (IQ)-based modulation scheme; and
transmitting the modulated first type of uplink information and the modulated second type of uplink information over an air interface,
wherein symbols modulated in accordance with the IQ-based modulation scheme are transmitted, using the set of allocated uplink radio resources, on uplink beams in accordance with the pattern of the one or more of the plurality of uplink beam directions, and
wherein the pattern of the one or more of the plurality of uplink beam directions is a pattern in a time-frequency domain and comprising selecting, in accordance with the first type of uplink information, an uplink beam direction for each resource element of the allocated uplink radio resources for each transmission time slot.

19. A wireless transmit/receive unit (WTRU), comprising:
a processor; and
a memory storing a plurality of instructions that, when executed by the processor, cause the processor to:
transmit a plurality of uplink reference signals,
wherein each uplink reference signal is transmitted in a respective different beam direction;
in response to the transmitted plurality of uplink reference signals, receive at least one control signal,
wherein the at least one control signal identifies a plurality of uplink beam directions to be used for uplink transmission;
modulate a first type of uplink information using beam direction modulation,
wherein modulating the first type of uplink information using the beam direction modulation comprises selecting, based on the first type of uplink information, a pattern of one or more of the plurality of uplink beam directions for the uplink transmission of one or more allocated uplink radio resources;
modulate a second type of uplink information using an in-phase quadrature (IQ)-based modulation scheme; and
transmit the modulated first type of uplink information and the modulated second type of uplink information over air interface,
wherein the modulated second type of uplink information is transmitted, using the one or more allocated uplink radio resources, on uplink beams in accordance with the pattern of the one or more of the plurality of uplink beam directions, and
wherein the pattern of the one or more of the plurality of uplink beam directions is a pattern in a time-frequency domain and comprising selecting, in accordance with the first type of uplink information, an uplink beam direction for each resource element of the allocated uplink radio resources for each transmission time slot.

* * * * *